US007860167B2

(12) United States Patent
Le Dinh et al.

(10) Patent No.: US 7,860,167 B2
(45) Date of Patent: Dec. 28, 2010

(54) APPARATUS AND METHOD FOR ADAPTIVE 3D ARTIFACT REDUCING FOR ENCODED IMAGE SIGNAL

(75) Inventors: Chon Tam Le Dinh, Montreal (CA); Ha Do Viet, Hanoi (VN); Ngoc Lan Nguyen, Montreal (CA); Duong Tuan Nguyen, St-Laurent (CA); Thi Thanh Hien Nguyen, Hue (VN)

(73) Assignee: Algolith Inc., Montréal, Québec (CA)

( * ) Notice: Subject to any disclaimer, the term of this patent is extended or adjusted under 35 U.S.C. 154(b) by 1489 days.

(21) Appl. No.: 11/191,912

(22) Filed: Jul. 29, 2005

(65) Prior Publication Data

US 2006/0050783 A1      Mar. 9, 2006

Related U.S. Application Data

(60) Provisional application No. 60/592,143, filed on Jul. 30, 2004.

(51) Int. Cl.
*H04N 7/12* (2006.01)
*G06K 9/40* (2006.01)

(52) U.S. Cl. .................................. 375/240.2; 382/260

(58) Field of Classification Search ................. 348/606; 382/260, 261, 275; 375/240.2
See application file for complete search history.

(56) References Cited

U.S. PATENT DOCUMENTS 5,512,956 A * 4/1996 Yan ............................ 348/606
6,064,776 A * 5/2000 Kikuchi et al. ............... 382/260
6,389,177 B1  5/2002 Chu et al.
6,983,079 B2 * 1/2006 Kim ............................ 382/275
7,076,113 B2 * 7/2006 Le Dinh ...................... 382/261

FOREIGN PATENT DOCUMENTS

EP           1 420 363        5/2004
WO      WO 02/102086      12/2002

OTHER PUBLICATIONS

Suthaharan S, "Non-linear filtering for block-edge reduction in digital video", (1998) Proceeding of the IEEE International Caracas Conference on Devices, Circuits and Systems, ICCDCS, pp. 178-180.

* cited by examiner

*Primary Examiner*—Gims S Philippe
(74) *Attorney, Agent, or Firm*—Alexandre Abecassis; Fasken Martineau DuMoulin LLP

(57) ABSTRACT

An efficient and non-iterative 3D post processing method and system is proposed for mosquito noise reduction, block localization and correction in DCT block-based decoded images. The 3D post processing is based on a simple classification that segments a picture in multiple regions such as Edge, Near Edge, Flat, Near Flat and Texture regions. The proposed technique comprises also an efficient and shape adaptive local power estimation for equivalent additive noise and provides simple noise power weighting for each above cited region. Temporal filtering configurations using Minimum Noise Variance Criterion are proposed for reducing temporally varying coding artifacts. A Minimum Mean Square Error or Minimum Mean Square Error-like noise reduction with robust and effective shape adaptive windowing is utilized for smoothing mosquito and/or random noise for the whole image, particularly for Edge regions. The proposed technique comprises also signal domain histogram analysis based Block Localization and adaptive edge based Block artifact correction. Finally, is also proposed an optional adaptive detail enhancer which can enhances the luminance signal in eight directions differently.

31 Claims, 9 Drawing Sheets

MNR2 Block Diagram

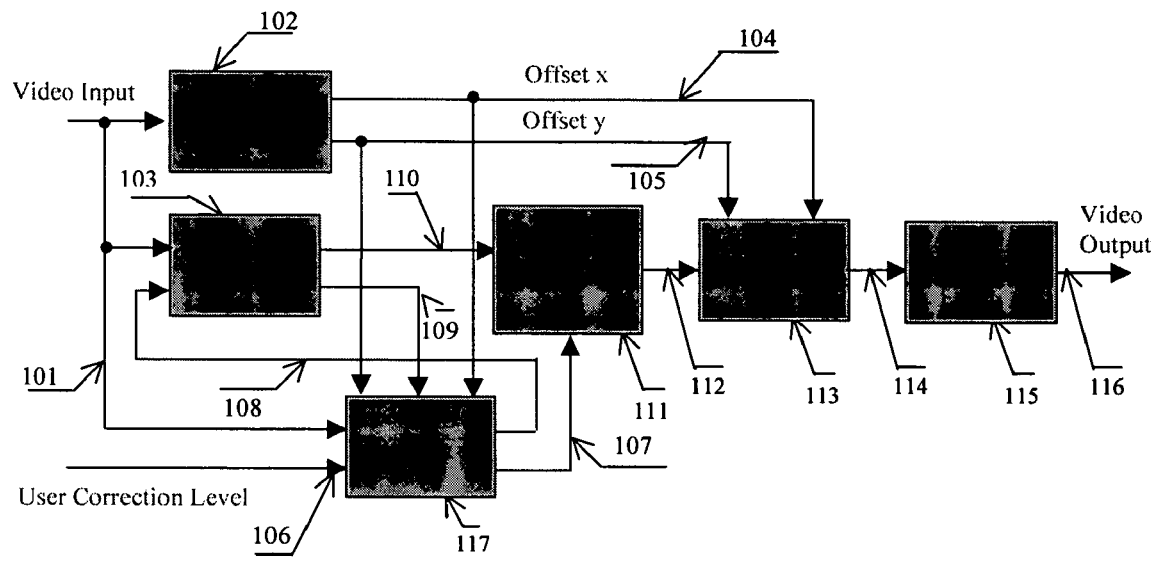
Figure 1 - MNR2 Block Diagram
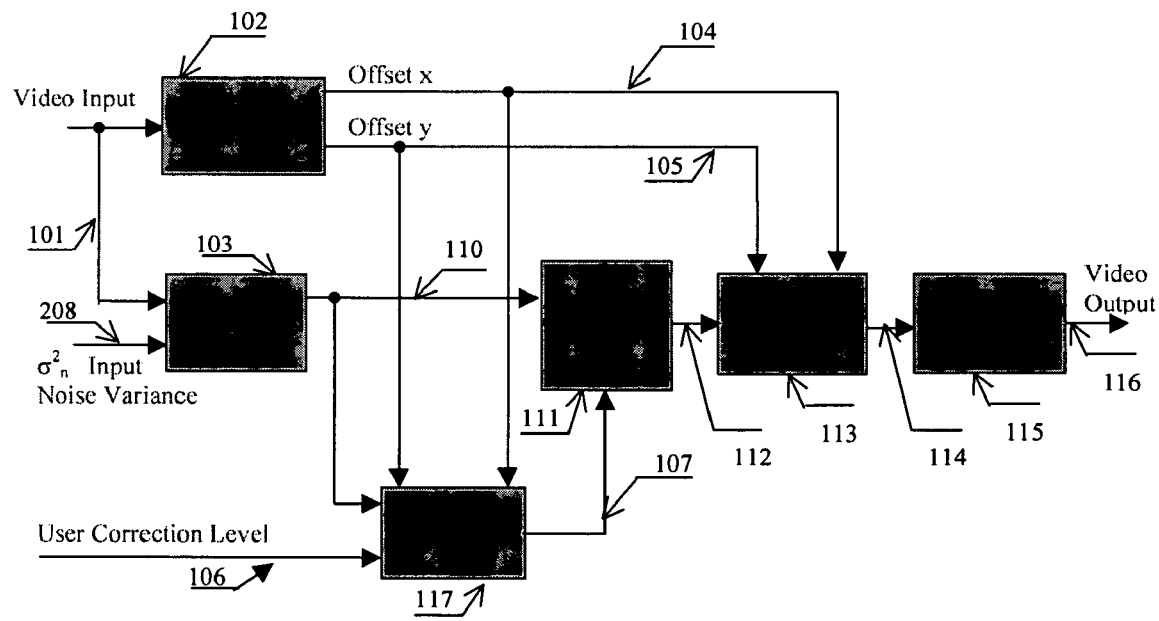
Figure 2 - A simplified MNR2 (MNR2-S) Block Diagram

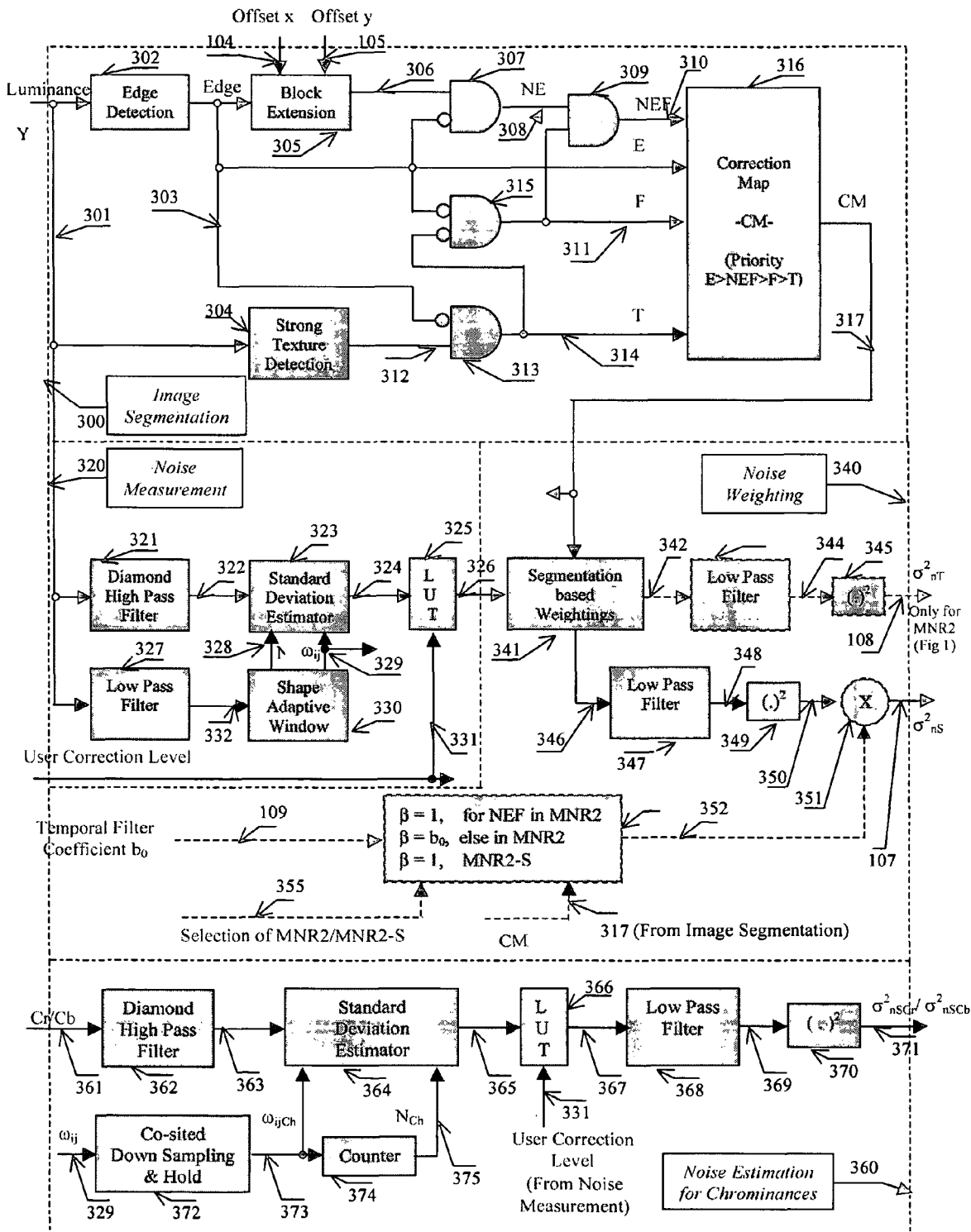
Figure 3 - Noise Estimation (NE) 117

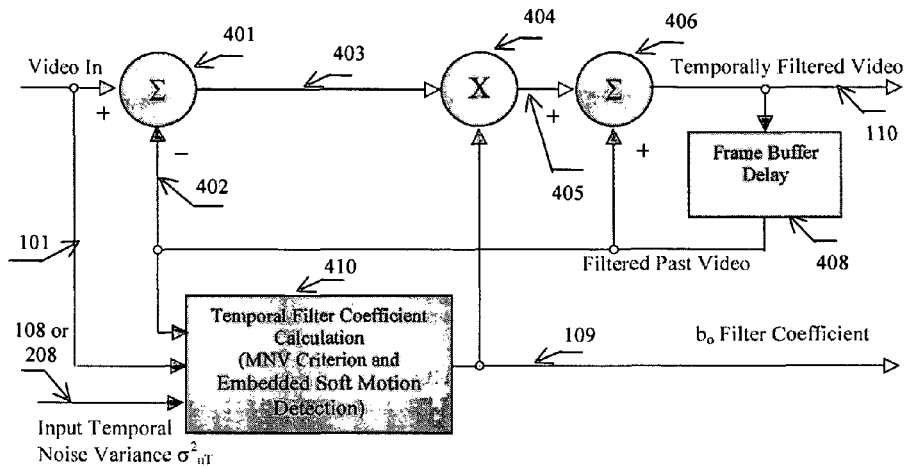
Figure 4a - Temporal Filter for Noise Reduction 103
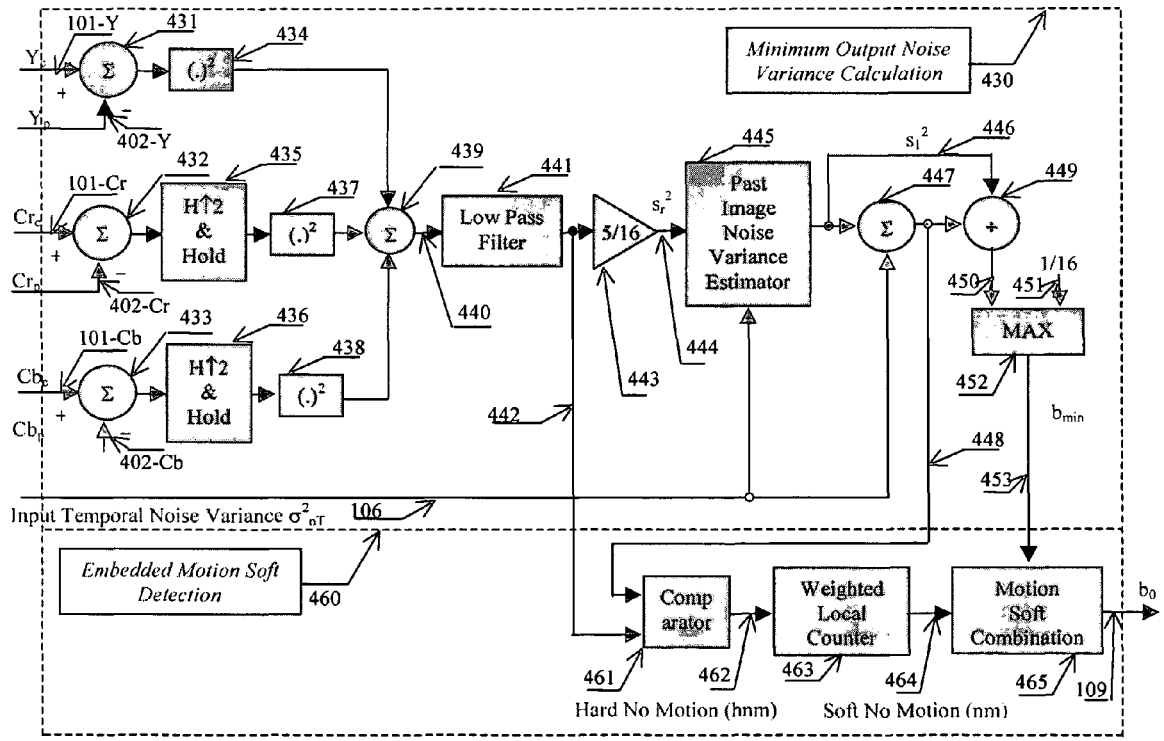
Figure 4b - Temporal Filter Coefficient Calculation 410

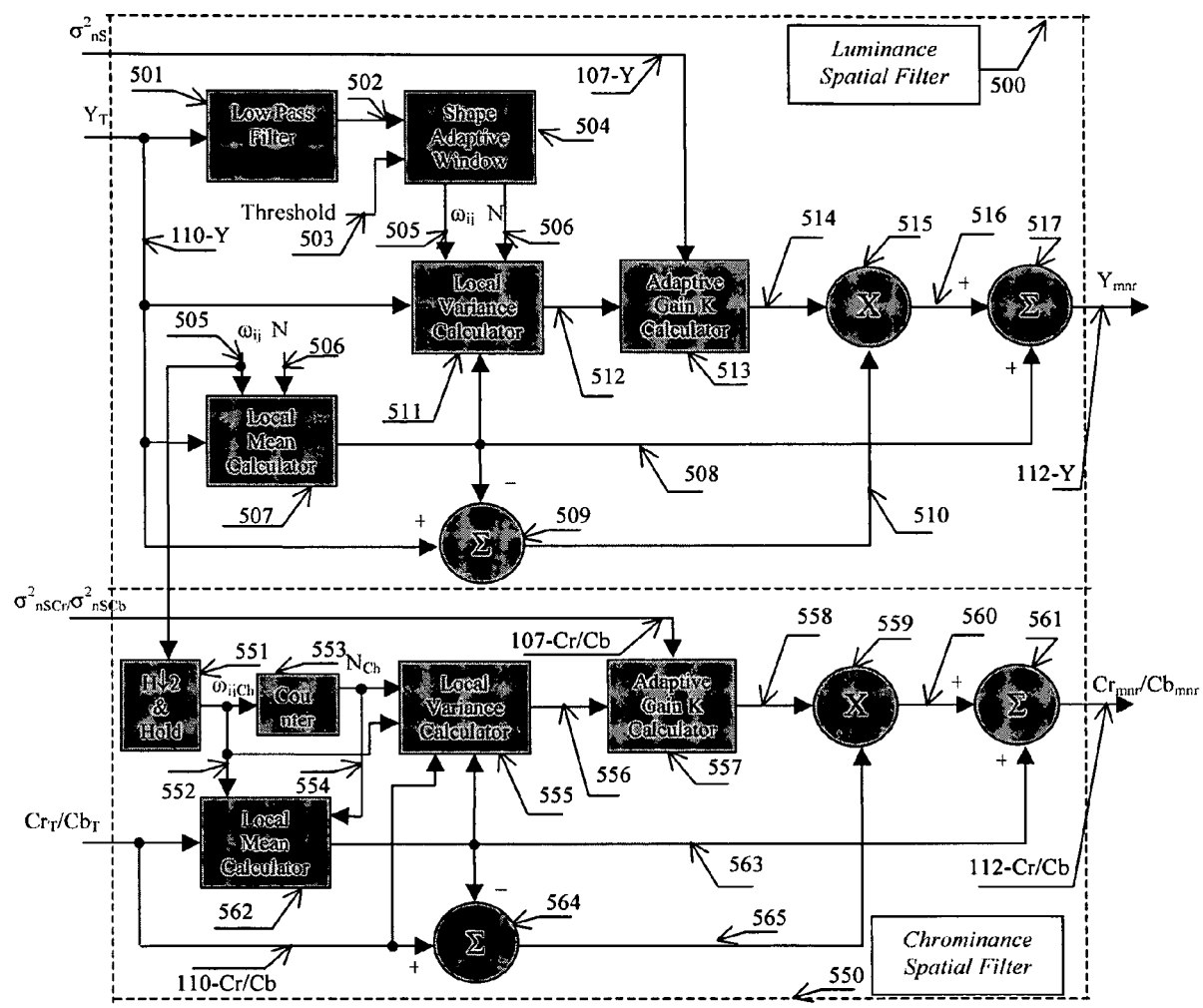
Figure 5 – Shape Adaptive MMSE Spatial Noise Reducer 111

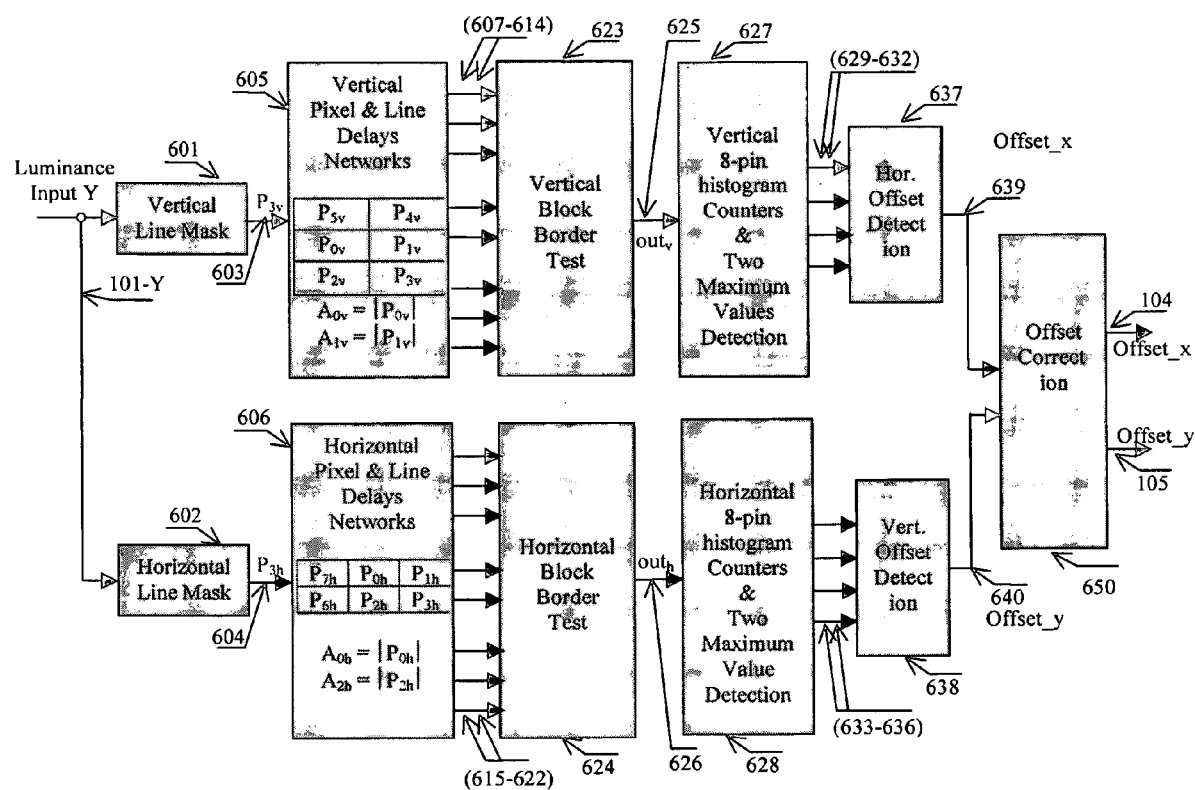
Figure 6 – Block Detection and Localization 102

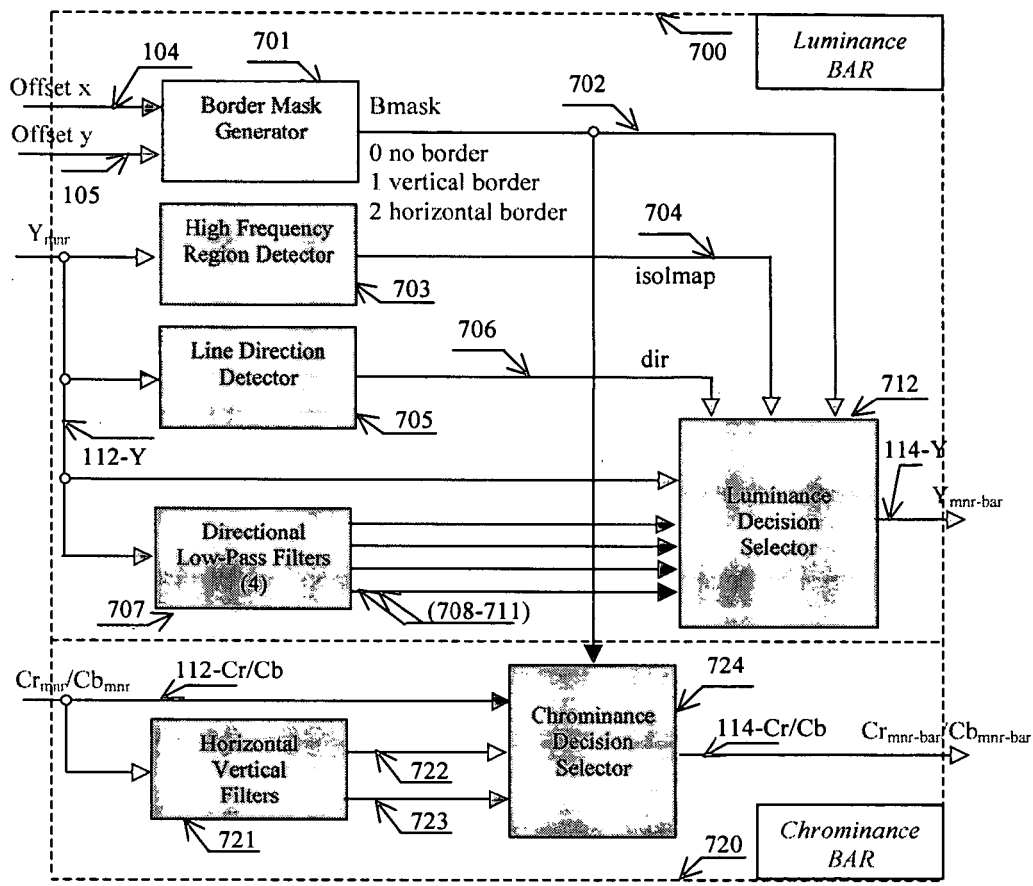
Figure 7a - Block Artifact Reduction 113
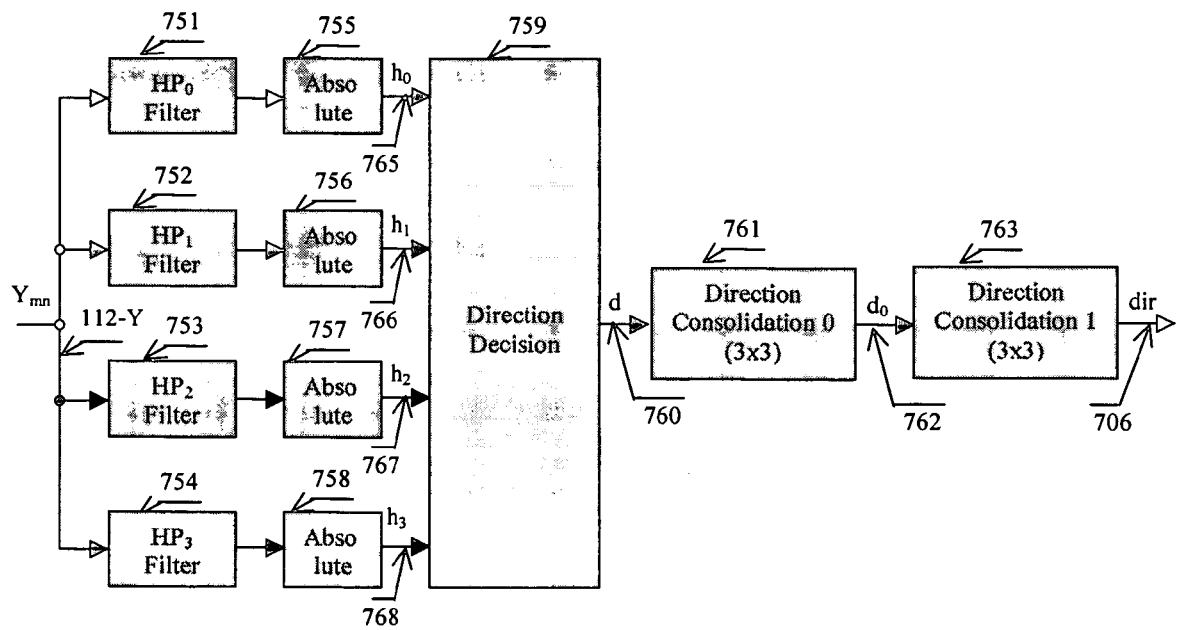
Figure 7b - Line Direction Detector in BAR

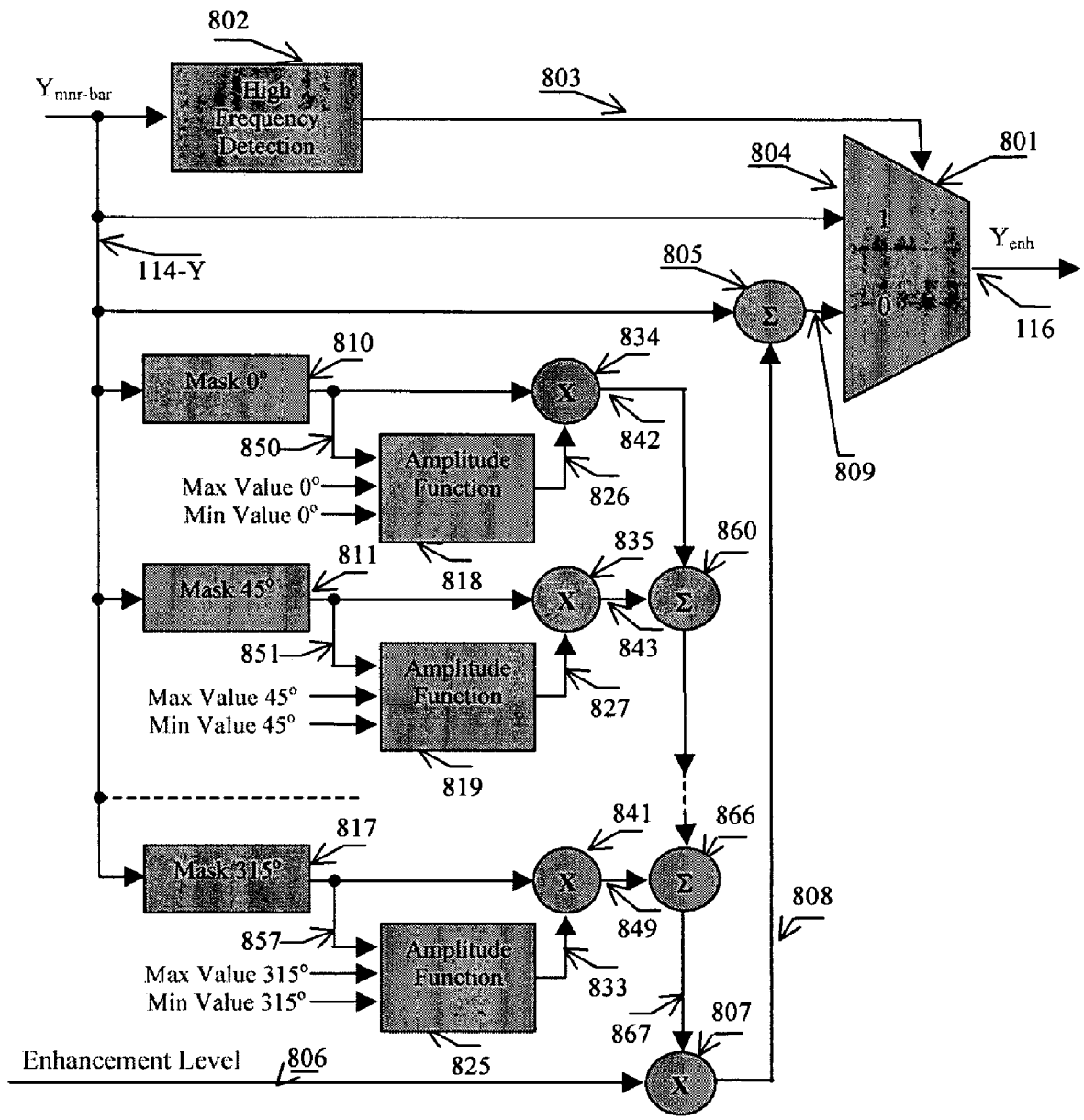
Figure 8 – Adaptive Directional Detail Enhancer 115

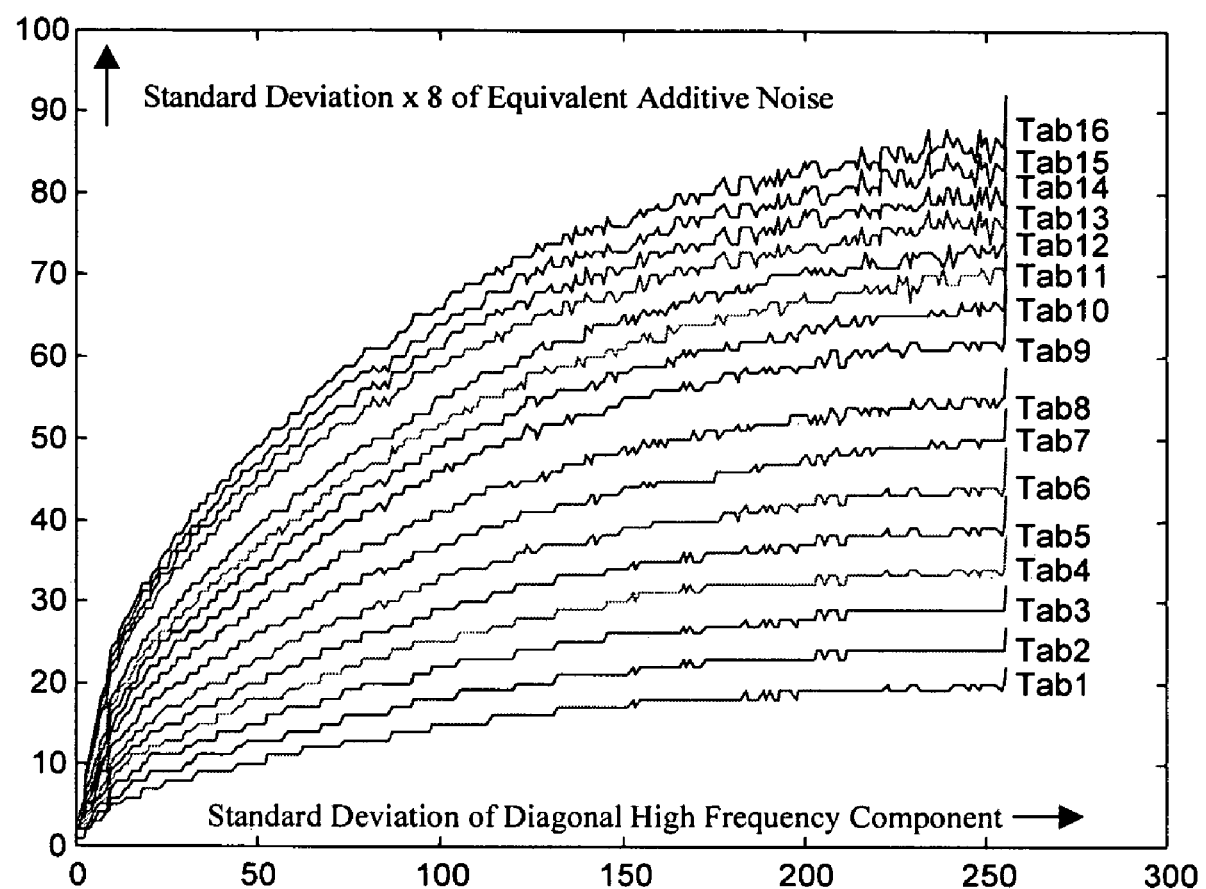
Figure 9 - Equivalent Additive Noise Conversion LUT

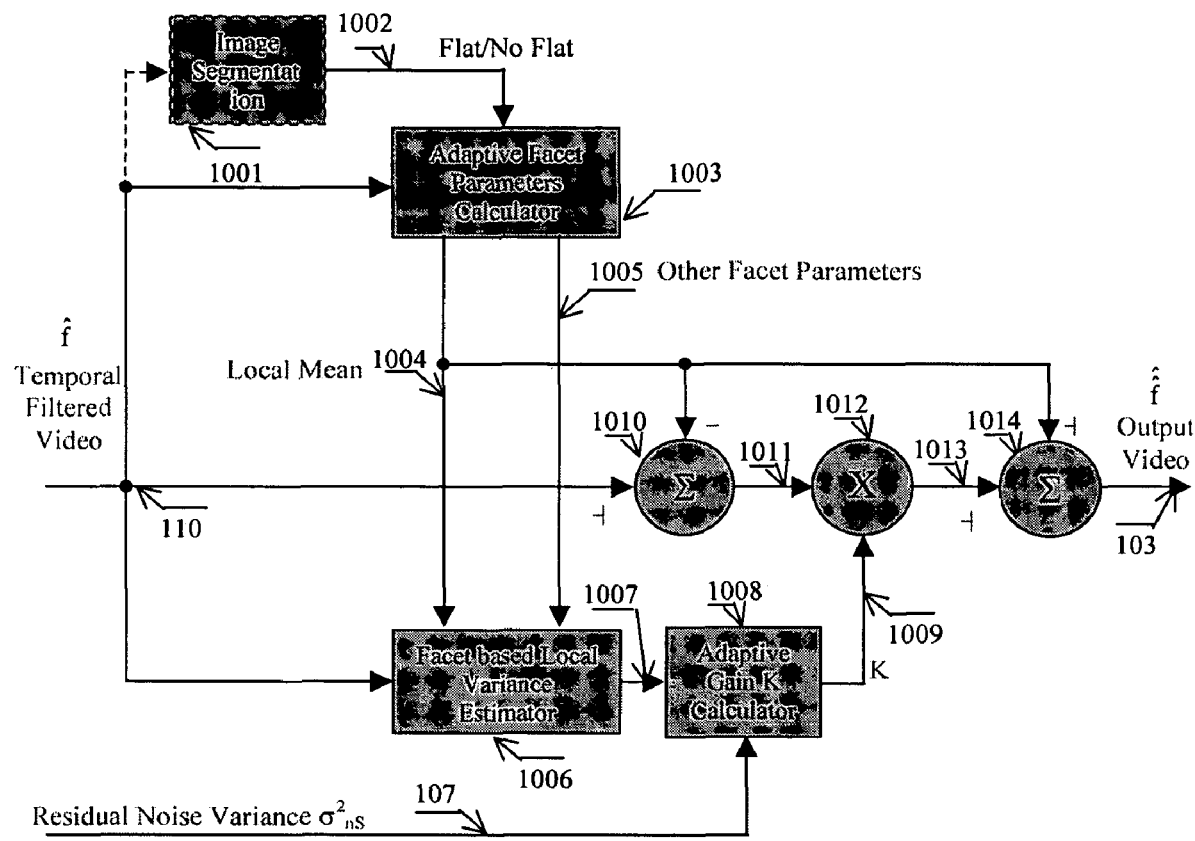
Figure 10 – Region adaptive Facet based MSE Spatial Noise Reducer 111

APPARATUS AND METHOD FOR ADAPTIVE 3D ARTIFACT REDUCING FOR ENCODED IMAGE SIGNAL

CROSS-REFERENCE TO RELATED APPLICATIONS

This application claims priority under 35 USC §119(e) of U.S. provisional patent application 60/592,143, filed Jul. 30, 2004 and entitled "Apparatus and Method for Adaptive 3D Artifact Reducing for Encoding Image Signal", the specification of which is hereby incorporated by reference.

FIELD OF THE INVENTION

The invention relates to image 3D noise reduction techniques primarily operable in real-time in an image or a sequence of images. More particularly, the invention relates to adaptive 3D techniques for artifact reduction in Discrete Cosine Transform (DCT) based decoded image applications.

BACKGROUND OF THE INVENTION

Recently, many international standards for still image and video compression such as the ITU-T H261, H263, H264 and the ISO JPEG, MPEG-1, MPEG-2 standards have mainly proposed the block based Discrete Cosine Transform (DCT) as a possible compression technique.

At low and moderate bit rates, block-based DCT coding artifacts become perceptible. Such artifacts are known as mosquito noise or ringing noise occurring around edges within an image or near a smooth zone as well as the blocking effect. For still pictures or still parts of image, the blocking effect is dominant and visible in smooth regions. For dynamic video sequences and in high resolution large screen display, mosquito noise can become evident for the human vision system (HVS).

There are many existing techniques for blocking effect reduction. In H. Reeve and J. Lim, "Reduction of blocking effects in image coding", Optical Engineering, vol. 23, January/February 1984, pp. 34-37, the authors teach the systematical use of low-pass filters applied at block boundary. Low pass filtering is utilized also in U.S. Pat. No. 5,850,294 to Apostolopoulos et al. for blocking artifact reduction purposes. However, the blocks that potentially exhibit block artifacts are detected in the DCT domain and low-pass filtering is applied only for the distorted blocks. In B. Ramamurthi and A. Gersho, "Nonlinear Space-variant post processing of block coded images", IEEE Transactions on Acoustics, Speech and Signal Processing, vol. ASSP-34, October 1986, pp. 1258-1268, the proposed adaptive filtering is based on the detection of edge orientation at each block boundary pixel. Many authors, as in, for instance, A. Zakhor, "Iterative Procedure for Reduction of Blocking Effects in Transform Image Coding", IEEE Transactions on Circuits and Systems for Video Technology, vol. 2, No. 1, March 1992, pp. 91-95, have proposed various multi-pass procedure techniques for this purpose. The iterative techniques can provide potentially a higher performance than the non-iterative ones, but are less attractive for real time processing.

Moreover, in existing techniques, the block localization is assumed to be known. This assumption is valid when the block correction is applied directly after the compression decoder. However, for home theater applications, the artifact correction can be everywhere from the decoder output to the final displayed image. In such situation, the considered image can be partially cropped or modified by various manipulations or even by analog conversion. The block position can thus be changed in respect to the image borders.

For mosquito noise artifact reduction (MNR), in U.S. Pat. No. 5,610,729, Nakajima teaches an estimation of block mean noise using the quantization step and the I, P, B coding mode when these data are available from the compressed bit stream. Nakajima teaches also the use of the well-known Minimum Mean Square Error (MMSE) filter proposed originally by J. S. Lee in "Digital image enhancement and noise filtering by use of local statistics", IEEE Transactions on PAMI-2, March 1980, pp. 165-168, for artifact reduction. However, in many applications, the quantization step or the coding mode is not necessary known or accessible. Moreover, while the Minimum Mean Square Error filter is efficient for edge reservation, it is not necessary for noise reduction near an edge. Mosquito Noise is a compression noise around edges.

In U.S. Pat. No. 5,754,699, Sugahara discloses a similar approach by using block quantization step size information for noise power estimation and an empiric coring technique for artifact filtering.

Also for MNR, in U.S. Pat. No. 5,850,294, Apostolopoulos et al. disclose a filtering on the true non-edge pixels within blocks containing edge pixels rather than smoothing the edge pixels, to avoid eventual blur and picture sharpness loss due to true edge filtering. However, the filtering technique for non-edge pixels is not clearly specified.

In a same manner, in U.S. Pat. No. 5,852,475, Gupta et al. apply separable low pass filters only on portions of an image that are not part of an edge and are not part of areas of texture or fine detail. The proposed post processor contains also a temporal digital noise reduction unit for noise flicker reduction and a look up table based shape adaptive window for reliable filtering on edge and texture. For the chrominance signals Gupta et al. teach the use of simple low pass filtering. U.S. Pat. No. 5,920,356 to Smita et al. is an ameliorated version of U.S. Pat. No. 5,852,475 in which the filtering is controlled by a coding parameter of the replenished macroblocks.

In U.S. Pat. No. 6,064,776 to Kikuchi et al., in a similar manner, a given block is classified according to whether it is considered part of a flat domain or not. If a block is considered as part of a flat domain, block pixel correction is then given by an AC component prediction technique.

In U.S. Pat. No. 6,188,799, Tan et al. teach the use of separable low-pass filtering, when block boundaries are located, for a serial reduction of blocking effect and then, mosquito noise. For detected blocking effect, the pixels are firstly corrected by a proposed modified version of bilinear interpolation and secondly, by a mean value of homogenous neighboring pixels within the quantization step size.

In U.S. Pat. No. 6,304,678 B1, Yang et al. teach the use of iterative pixel clustering technique in a sliding window and the artifact correction mainly based on maximum likelihood estimation. There is no discussion about real-time processing.

In PCT Application No PCT/CA02/00887, an adaptive spatial MNR has been proposed. The temporal dimension important for some artifact flickering is not considered by the application. The blocking detection and correction are not also considered.

SUMMARY OF THE INVENTION

The present invention provides an apparatus and method for efficiently reducing noise or artifact in a block-based decoded image signal.

According to an aspect of the present invention, there is provided an apparatus for reducing noise in a block-based decoded image signal including a luminance component. The apparatus comprises a noise power estimator responsive to said luminance component in a same frame of said image signal to classify the luminance pixel in a selected one of a plurality of predetermined image region classes associated with distinct image region spatial characteristics and to generate a corresponding selected region class indicative signal. The said noise power estimator further comprises a shape-adaptive luminance noise power estimator responsive to said luminance component and said selected region class indicative signal for estimating statistical characteristics of said luminance pixel by using local window segmentation data associated with the luminance pixel, to generate a corresponding luminance noise power statistical characteristics indicative signal. Conveniently, the distinct image region spatial characteristics include edge, near edge flat, flat and texture spatial characteristics. The noise power estimator comprises a shape-adaptive chrominance noise power estimator responsive to said chrominance components for estimating statistical characteristics of first and second chrominance pixels associated with said luminance pixel by using local window segmentation data associated with each said chrominance pixel to generate a corresponding chrominance noise power statistical characteristics indicative signal. The apparatus comprises further a minimum output variance temporal noise reducer and a spatial noise reducer for filtering said luminance and chrominance components according to said luminance and chrominance noise power statistical characteristics indicative signal. The said temporal noise reducer can be region-based varying or simply stationary for the whole image. The said temporal filter comprises further context-based soft motion detection for minimizing motion blur artifact. The said spatial noise reducer based on minimum mean squared error can be utilized shape adaptive windowing technique or region adaptive facet model parameters calculation. The apparatus further comprises a block localizer responsive to said luminance component for determining block position in a frame of said image. The said block localizer working on signal domain utilizes line matched filter and histogram analysis for block detection. The apparatus further comprises a blocking artifact reducer for said luminance and chrominance components. Blocking artifact reducer comprises edge-based filters for said luminance, horizontal and vertical filters for chrominance components. Blocking artifact reducer comprises also high frequency region detector for avoiding possible high frequency artifacts. Finally, the apparatus further comprises an optional detail enhancer for said luminance component. The said detail enhancer adaptively enhances the luminance signal differently in each of eight (8) principal directions.

According to a further aspect of the present invention, there is provided a method for reducing noise in a block-based decoded image signal including a luminance component. The method comprises the steps of: i) noise power estimation according to a corresponding luminance pixel spatial context in a same frame of said image signal to classify the luminance pixel in a selected one of a plurality of predetermined image region classes associated with distinct image region spatial characteristics and to generate a corresponding selected region class indicative signal; ii) estimating, from said luminance component and said selected region class indicative signal, statistical characteristics of said luminance pixel by using shape-adaptive local window segmentation data associated with the luminance pixel, to generate a corresponding luminance noise power statistical characteristics indicative signal; and iii) spatio-temporal filtering said luminance component according to said luminance noise power statistical characteristics indicative signal. Conveniently, the distinct image region spatial characteristics include edge, near edge flat, flat and texture spatial characteristics. Preferably, the block-based decoded image signal further includes first and second chrominance components and, method further comprises the steps of: iv) estimating, from said chrominance components statistical characteristics of first and second chrominance pixels associated with said luminance pixel by using shape-adaptive local window segmentation data associated with each said chrominance pixel to generate a corresponding chrominance noise power statistical characteristics indicative signal; and v) spatio-temporal filtering each said chrominance components according to said corresponding chrominance noise power statistical characteristics indicative signal.

According to a further aspect of the present invention, there is provided an apparatus and method for post-processing a decompressed image signal to reduce spatial mosquito noise and blocking artifact therein. In particular, the post processor calls for an image multiple region segmentation, region noise power estimations for respectively luminance and chrominance signal components, and their associated adaptive noise corrections.

In segmenting an image into regions, the inventive apparatus and method employ edge/no-edge detectors and simple binary consolidation operators to classify and reinforce detected Edge (E), Near-Edge-Flat regions (NEF), Flat regions (F), and finally Texture (T) regions. The preferred segmentation is based essentially on the following observations: First, almost strong mosquito noise is found in NEF regions; second, some important noise is also noticeable in picture edges; third, texture masks mosquito noise; and fourth, any excessive filtering in texture or flat regions will degrade eventually fine signal details.

In estimating local noise power of the luminance component of the image signal, the apparatus and method consider the diagonal high frequency component of the decoded image. The local noise power estimator comprises a local variance calculator that considers only local similar pixels to the current one, a look up table (LUT) for a conversion from observed diagonal high frequency component power to equivalent additive noise power. The noise power estimator also comprises a noise power weighting for each classified region and finally a low-pass filter for smoothing the variation of estimated local noise power between regions. Thus, the proposed method permits different smoothing degree for each segmented region and region transition to ensure resulting image quality.

For noise correcting, the proposed apparatus and method are based on: i) minimization of the output noise variance for the temporal filter; ii) a shape adaptive local segmented window that considers only the similar intensity pixels to the current one for the local mean and local standard deviation estimations. For reliable window segmentation, a two-dimensional (2D) low pass filter is preferably required for the local adaptive windowing. The noise corrector further comprises a gain calculator in order to minimize the Mean Square Error (MMSE) for given local signal mean, local signal power and local additive noise power. The combination of local shape adaptive windowing and Minimum Mean Square Error constitutes a noise corrector working on all of the above-cited classified regions.

It is worthwhile to mention that the proposed mosquito noise filtering also partly reduces the blocking effect.

From another broad aspect of the present invention, there is also provided an adaptive apparatus and method for noise power estimation and noise correction for the chrominance components which are severely damaged at low bit rate in a decoded video signal. In estimating local noise power in each chrominance component, the proposed method is similar to luminance component processing. However, in the chrominance case, the region classification is not required. In other words, there is only a single region for the whole image. For noise correcting of the chrominance component, the above luminance-based shape adaptive windowing and the Minimum Mean Square Error technique are both utilized in a similar manner to the luminance case. Considering the chrominance-sampling rate requires the use of suitable interpolation and decimation techniques for the chrominance signals.

According to another aspect of the invention, there is provided a method for reducing artifact in a DCT-based decoded image, the method comprising associating each pixel of a plurality of pixels defining the image to corresponding image region having distinct spatial characteristics, estimating artifact statistical characteristics of each of the pixel using the associated corresponding image region and performing a tempo-spatial filtering of each of the pixels using the artifact estimated statistical characteristics of the pixel, whereby the filtered pixels produce the image having reduced noise or reduced artifact.

According to another aspect of the invention, there is provided a method for reducing artifact in a DCT-based decoded image, the method comprising associating each pixel of a plurality of pixels defining the image to corresponding image region having distinct spatial characteristics, estimating artifact statistical characteristics of each of the pixel using the associated corresponding image region, performing a filtering of each of the pixels using the artifact estimated statistical characteristics of the pixel, whereby the filtered pixels produce the image having reduced noise or reduced artifact; and correcting the filtered pixels against artifact related to a compression technique used for encoding said image.

According to another aspect of the invention, there is provided an apparatus for reducing artifact in a DCT-based decoded image, the apparatus comprising a noise estimation unit for providing artifact statistical characteristics of each pixel of a plurality of pixels defining the image, wherein the artifact statistical characteristics of each pixel are estimated by associating to a given pixel a corresponding given image region having distinct spatial characteristics and a tempo-spatial filtering unit receiving the artifact statistical characteristics of each pixel and filtering the pixel accordingly to provide a temporally-spatially filtered signal.

BRIEF DESCRIPTION OF THE DRAWINGS

Embodiments of the present invention will be now described with reference to the accompanying drawings, in which:

FIG. 1 is a block diagram of an preferred embodiment of a mosquito noise reducing apparatus;

FIG. 2 is also a block diagram of another embodiment of a mosquito noise reducing apparatus;

FIG. 3 is a block diagram of an embodiment of a noise power estimation unit;

FIG. 4a is a block diagram of an embodiment of a temporal filter for noise reduction with soft motion detection;

FIG. 4b is a block diagram of one embodiment of a temporal filter coefficient calculation with embedded motion estimation;

FIG. 5 is a block diagram of an embodiment of a shape adaptive window spatial noise reducer;

FIG. 6 is a block diagram of one embodiment of a block detection and localization unit;

FIG. 7a is a block diagram of one embodiment of a block artifact reducer;

FIG. 7b is a block diagram of one embodiment of a line direction detector, part of blocking artifact reduction;

FIG. 8 is a block diagram of an embodiment of an optional detail enhancer block correction;

FIG. 9 illustrates sixteen curves stocked in a lookup table (LUT) for converting diagonal high frequency local standard deviation signal into local standard deviation of MPEG artifacts' equivalent additive noise;

FIG. 10 is a block diagram of an embodiment of a region adaptive facet model spatial noise reducer.

DETAILED DESCRIPTION

Referring now to the drawings, FIG. 1 represents a block diagram of an embodiment of a MPEG noise reduction apparatus MNR2 10 in accordance with the invention.

The MNR2 apparatus 10 receives two main system inputs. The first received input 101 is an image video signal comprising luminance Y and chrominance Cr/Cb components. For simplicity purpose, FIG. 1 illustrates only a video input signal.

The skilled addressee will understand that, except different indications, such system components may be implemented in a time sharing manner or in parallel as it is well known in the art.

The second input corresponds to a user correction level which is applied at input 106.

The user correction level at input 106 may represent, for instance, an intensity of noise correction or, if possible, coding transmission rate. In a preferred implementation, this user correction level input is controlled by an end-user in a heuristic manner.

The Mosquito Noise Reducer apparatus 10 comprises a Noise Estimation (NE) unit 117, a Temporal Filter (TF) 103, a Spatial Noise Reducer (SNR) 111, a Block Localization Unit 102, a Block Artifact Reducer (BAR) 113 and an Optional Detail Enhancer 115.

The Noise Estimation unit 117, described in detail below with reference to FIG. 3, receives the video input 101 and the user correction level 106 and generates noise power estimations at each pixel. The noise power estimations 108 and 107 are provided respectively to the Temporal Filter (TF) 103 and to the Spatial Noise Reducer 111.

The Temporal Filter 103 determines its optimum filter coefficient 109 which is sent back in turn to the Noise Estimation unit 117 in order to establish a residual noise power 107 for the Spatial Noise Reducer 111.

The Noise Estimation unit 117 receives also Offset x 104 and Offset y 105 from the Block Localization Unit 102 for correctly segment the Near Edge Flat region which will be described below in FIG. 3.

It will be appreciated that in the case where the apparatus is placed immediately after a compression decoder, the Block Localization Unit 102 may not be required since for in this case the Offset x and the Offset y are both known equal to zero, i.e., no offset in accordance with image borders.

The Temporal Filter 103, described in detail below with reference to FIGS. 4a and 4b, receives the video input signal 101 and the region-based noise power estimation signal 108 and generates the optimum filter coefficient 109 and a temporally filtered image 110. The optimum filter coefficient 109 is applied to the Noise Estimation unit 117. The temporally filtered image 110 is sent in turn to the Spatial Noise Reducer 111.

The Spatial Noise Reducer 111, described in details below with reference to FIG. 5, receives the temporally filtered image signal 110 and the spatial noise power estimation signal 107 and performs a Minimum Mean Squared Error filtering for spatial compression artifact reduction. The resulting image (also referred to as spatio-temporally filtered image) 112 is sent to the Block Artifact Reducer 113.

It is worthwhile to note that temporal and spatial noise filtering reduce partially the compression blocking effect.

The Block Localization Unit 102, described in detail below with reference to FIG. 6, receives the luminance input image 101 and determines the horizontal (Offset x) and vertical (Offset y) offsets 104 and 105 respectively and sends these signals to the Noise Estimation unit 117 and to the Block Artifact Reducer 113. It is important to note that for economic and low latency purposes, the detected offsets in the current frame are applied for the next frame in supposing the same offsets between two consecutive frames.

The Block Artifact Reducer 113, described in details below with reference to FIG. 7a, receives the spatio-temporally filtered image 112 and the offset value signals 104 and 105 and estimates edge directions, to determine block border pixels and to suitably apply filtering for blocking artifact reduction.

The resulted image 114 is provided to the Optional Detail Enhancer 115. It is worthwhile to mention that edge direction filtering is applied for the luminance video component. Meanwhile, only simple horizontal or vertical filters are used for Cr and Cb components.

The Optional Detail Enhancer 115, described in details below with reference to FIG. 8, receives the filtered image 114 and provides a final enhanced image 116 without enhanced high frequency alias.

Now referring to FIG. 2, there is illustrated in block diagram another embodiment of a mosquito noise reducing apparatus (also referred to as MNR2-S).

Except few differences which will be described in detail below, the mosquito noise reducing apparatus MNR2-S is similar to the previously described mosquito noise reducing apparatus 10 shown in FIG. 1.

More precisely, a first difference is the temporal filter input 208 of noise variance signal which is now controlled by an end-user in contrast to the feedback signal 108 provided by the Noise Estimation unit 117. In another word, the temporal filter 103's functionality is now independent of the segmentation-based noise estimation.

It is worthwhile to note that in such case the temporal filter 103 becomes a temporal dynamic noise reducer for independent random noise and the spatial filter SNR is reserved therefore for coding artifact noise.

A second difference is the Noise Estimation unit input 110 which is now provided by the temporal filter 103. Meanwhile, in FIG. 1, the Noise Estimation unit 117 receives directly the video input 101. In the former case, with temporally filtered image input 110, the Noise Estimation unit 117 does not require furthermore the temporal filter coefficient signal 109 in order to estimate residual noise power.

The skilled addressee will appreciate that the purpose of these modifications is essentially to reduce some delay lines, not shown in the figures, required for hardware implementation.

Referring now to FIG. 3, there is illustrated in block diagram an embodiment of the Noise Estimation unit 117.

The Noise Estimation unit 117 comprises an Image Segmentation unit 300, a Noise Measurement unit 320, a Noise Weightings unit 340 and a Noise Estimation for Chrominance unit 360.

The Image Segmentation unit 300 is necessary only for luminance component of the video signal. It will be appreciated that the Image segmentation for chrominance components Cr and Cb is not required.

The Image Segmentation unit 300 receives a luminance component signal 301 of the video input signal 101 or the temporally filtered video signal 110 in accordance with the mosquito noise reducer 10 disclosed in FIG. 1 or the mosquito noise reducer 12 disclosed in FIG. 2. The luminance component signal 301 is sent to an Edge Detector 302 and to a Strong Texture Detector 304.

It will be appreciated that there are many techniques to conceive an edge detector. However, for Mosquito Noise purpose, it has been contemplated that it is necessary to detect only strong edges. The implemented Edge Detector 302 comprises a low pass filter, for some noise robustness, followed respectively by 4 parallel Sobel gradient compasses, a summing of absolute values, a threshold detector and some context-based binary filtering for removing isolated pixels or for reinforcing missed detected edges. The skilled addressee will understand the Edge Detector description.

The Edge Detector 302 provides at its output 303 a detected Edge (E) map signal. The detected Edge (E) map signal is provided to a Block Extension 305, to a negative input of gates 307, 313 and 315 and finally to a correction map 316.

The Strong Texture Detector 304 is composed in series of Low pass filter, Sobel gradient compasses, Absolute values, Maximum detector, Threshold detector and some context-based binary filtering for removing isolated pixels or for reinforcing broken detection. The Strong Texture Detector 304 output signal 312 is applied now to the non negative input of the gate 313. The latter realizes detected texture (T) signal 314 as detected strong texture 312 but not edge 303. It might require a context-based binary filter, not shown, placed directly after the gate 313 if the gate output signal still contains isolated or broken detection. The detected texture signal (T) 314 is applied in turn as input to the NOR gate 315 and to the correction map 316.

The NOR gate 315 is used for Flat (F) region detection considered as not texture (T) and not edge (E). The NOR gate 315 output 311 is provided to the correction map 316.

The previously described Edge (E) signal 303, together with the two block offset values 104 and 105 are applied to the Block Extension 305. Within a compression block with appropriate offset values, if there is a detected Edge pixel Block Extension will consider the block as Block Edge. The block extension output 306 is provided to the positive input of the gate 307 which defines Near Edge (NE) region signal 308 as Block Edge but not Edge. The Near Edge (NE) region signal 308 and the Flat (F) signal 315 are combined together with an AND gate 309 to provide a Near Edge and Flat (NEF) signal 310. The Near Edge and Flat (NEF) signal 310 is provided to the Correction Map (CM) 316.

It is worthwhile to mention that most of mosquito noises are found in Near Edge and Flat (NEF) and Edge (E) regions.

Usually, Block Extension is of dimension 8×8 for the progressive luminance signal or 4×8 (4 lines×8 columns) for interlaced luminance signal. However, for practical purposes and for a better correction, block extension sizes may be set wider than usual to reach dimensions such as 8×10 or 4×10.

The Correction Map 316 receiving the 4 input signals (NEF), (E), (F) and (T) is used to solve any eventual ambiguity in the above segmentation. The Correction Map 316 performs the final segmentation defined with the following priorities for each pixel (E)>(NEF)>(F)>(T). The correction map output signal 317 is provided to the Noise Weighting sub module 340 in order to establish the noise level to be considered.

Prior to performing noise weighting, it is necessary to get first a Noise Measurement for each considered pixel. The Noise Measurement unit 320 is provided for that purpose. The Noise Measurement unit 320 receives the luminance component 301 of the video signal to provide estimated local compression noise power. In order to reduce true signal variation effects, the proposed Noise Measurement unit 320 uses a diamond high pass filter 321 applied on the luminance signal input Y 301 to extract only diagonal high pass component. The high pass filter impulse response is given as follows:

$$hp(c, r) = \begin{bmatrix} 0 & 0 & -1 & 0 & 0 \\ 0 & -2 & -8 & -2 & 0 \\ -1 & -8 & 44 & -8 & -1 \\ 0 & -2 & -8 & -2 & 0 \\ 0 & 0 & -1 & 0 & 0 \end{bmatrix} / 64.$$

The diamond filter output 322 is provided to a standard deviation estimator 323 which receives also the two inputs 329 and 328 respectively for $\omega_{ij}$ and N defined in details below.

The signals 329 and 328 respectively for $\omega_{ij}$ and N, provided from a Shape Adaptive Window 330, are defined as:

Let (c,r) be the current pixel coordinates. Let (i,j) be the relative coordinates of a pixel in the rectangular window of size $N_c$ by $N_r$ around the current central pixel. Shape adaptive windowing yields a binary value for the pixel (i,j) using the following expression:

$$\omega_{ij}(c, r) = \begin{cases} 1, & \text{if } |lp(Y_{ij}(c, r) - lp(Y(c, r))| < \text{Threshold} \\ 0, & \text{else} \end{cases}$$

$$\text{and } N = N(c, r) = \sum_{i,j} \omega_{ij}(c, r).$$

In the above equation Y(c,r) is the current luminance input, $Y_{ij}(c,r)$ is the luminance at the relative coordinates (i,j) in the window centered around the current pixel (c,r). Y(c,r) is clearly $Y_{00}(c,r)$. And $lp(Y_{ij}(c,r))$ denotes the low pass filter output 332 at the relative coordinates (i,j) in the current window centered at (c,r).

The presence of the low pass filter 327 for robustness against noise is important for the followed local segmentation Shape Adaptive Window 330. Many low pass filters are possible. In one embodiment, the low pass filter impulse response is given by:

$$lp(c, r) = \begin{bmatrix} 7 & 7 & 7 \\ 7 & 8 & 7 \\ 7 & 7 & 7 \end{bmatrix} / 64.$$

The skilled addressee will appreciate that this is simply a modified low pass mean.

The local standard deviation estimator 323 of the high frequency signal is estimated by:

$$s_{hf}(c, r) = (1/N(c, r)) \sum_{i,j} \omega_{ij} \cdot |hp(Y_{ij}(c, r)|.$$

in which $hp(Y_{ij}(c,r))$ denotes diamond filter output 322. Since shape adaptive windowing is relatively of small size, 5 lines by 11 columns in the proposed implementation, the hardware division by N(c,r) can be done by a small look up table, not shown.

It may be worthwhile to note the following relationship between the true variance and the absolute deviation:

$$\sigma^2_{hf}(c,r) = C \cdot s^2_{hf}(c,r)$$

where C is a scaling constant depending on signal distribution. The scaling constant C can be absorbed in subsequent operations.

Standard deviation estimator output 324 is sent now to Lookup table 325 which also receives as input User Correction Level 331. The Lookup table 325 is pre-calculated look up table to convert the previously defined local standard deviation 324 $s_{hf}(c,r)$ of high frequency signal into the local standard deviation of MPEG artifacts' equivalent additive noise. The content of the Lookup table 325 is selected by the mode value and the selected Lookup table 325 has been obtained from extensive testing of various MPEG bit rates on many video sequences. The Lookup table 325 output 326 provides the local standard deviation of MPEG artifacts in terms of equivalent additive noise. In the current implementation, 16 user-controlled levels 331 corresponding to 16 Lookup table curves illustrated in FIG. 9 are provided. Lookup table output 326 is provided to the Noise Weighting sub module 340.

The Noise Weighting sub module 340 comprises Segmentation-based Weightings 341 to provide local noise variances for both temporal and spatial filtering in the case of the embodiment of the mosquito noise reducer shown in FIG. 1, or only local noise variance for spatial filter in the case of the embodiment of the mosquito noise reducer shown in FIG. 2.

The Segmentation-based Weightings 341 receives together the local standard deviation 326 and the correction map signal 317. The Segmentation-based Weightings 341 performs a weighting on the standard deviation 326 in function of the correction map signal 317:

Let $\sigma(c,r)$ be the estimated local noise standard deviation 326. The region-based local noise standard deviation $\sigma_{rT}(c,r)$ 342 for temporal filter 103 is defined by $$\sigma_{rT}(c,r) = \sigma(c,r) \cdot \text{Temporal-Region-factor}.$$

Similarly, for spatial filter 111, the region-based local noise standard deviation $\sigma_{rS}(c,r)$ 346 is written as $$\sigma_{rS}(c,r) = \sigma(c,r) \cdot \text{Spatial-Region-factor}.$$

It will be appreciated that the Region-factor may depend on the mosquito noise reducer provided (i.e. the one disclosed in FIG. 1 or the one disclosed in FIG. 2). In fact, Region-factors are parameters allowed to the designer's discretion. In the proposed implementation, Region-factors are resumed in the following table:

| Configuration | Region | Temporal Filter | Spatial Filter |
|---|---|---|---|
| Mosquito Noise Reducer disclosed in FIG. 1 | Edge (E) | 32/32 | 38/32 |
| | Near Edge Flat (NEF) | 32/32 | 38/32 |
| | Flat (F) | 16/32 | 12/32 |
| | Texture (T) | 2/32 | 2/32 |
| Mosquito Noise Reducer disclosed in FIG. 2 | Edge (E) | — | 34/32 |
| | Near Edge Flat (NEF) | — | 34/32 |
| | Flat (F) | — | 0/32 |
| | Texture (T) | — | 0/32 |

Moreover, in order to reduce the halo artefact for different levels of correction, low pass filtering 343 and 347 on standard deviation images are recommended. In the current implementation, the following low pass filter is used before the squaring processes 345 and 349:

$$lp(c, r) = \begin{bmatrix} 1 & 4 & 6 & 4 & 1 \\ 2 & 8 & 12 & 8 & 2 \\ 1 & 4 & 6 & 4 & 1 \end{bmatrix} \Big/ 64$$

The squaring 345 output 108 corresponding to the estimated local noise variance to be processed is provided to the Temporal Filter 103 for the Mosquito Noise Reducer disclosed in FIG. 1. For the Mosquito Noise Reducer disclosed in FIG. 2, low pass filter 343 and squaring 345 are not necessary.

Meanwhile the squaring 349 output 350 is provided to the multiplier 351 to adjust residual noise variance 107 for the Spatial Filter 111. The other input 352 of the multiplier 351 is a coefficient β defined by selected configuration shown in FIG. 1 or FIG. 2 and provided by the Temporal Filter 103.

Let $b_0$ 109 be the temporal filter coefficient provided by the Temporal Filter 103. The coefficient β 352 is given by the followings:

$$\beta = \begin{cases} 1, & \text{for } NEF \text{ in } MNR-2 \\ b_0, & \text{for other regions in } MNR-2 \\ 1, & \text{in } MNR2-S \end{cases}$$

The above expression can be realized with the multiplexer 353 which receives also as inputs the output 317 of the correction map 316 and Selection of MNR2/MNR2-S 355. In the case of the mosquito noise reducer shown in FIG. 2, the multiplexer 353 and the multiplier 351, in dash, are not required.

For chrominance components, the noise estimation for chrominance sub module 360 in FIG. 3 is much simpler with no required segmentation. In 4:2:2 sampling pattern, the noise estimation for chrominance sub module 360 receives two multiplexed chrominance components Cr and Cb at the input 361. For reducing the true signal variation, the multiplexed components Cr and Cb are sent to a diamond shape high pass filter 362.

The latter impulse response for multiplexed signals is given by:

$$Ch\_hp(c, r) = \begin{bmatrix} 0 & 0 & 0 & 0 & -1 & 0 & 0 & 0 & 0 \\ 0 & 0 & -2 & 0 & -8 & 0 & -2 & 0 & 0 \\ -1 & 0 & -8 & 0 & 44 & 0 & -8 & 0 & -1 \\ 0 & 0 & -2 & 0 & -8 & 0 & -2 & 0 & 0 \\ 0 & 0 & 0 & 0 & -1 & 0 & 0 & 0 & 0 \end{bmatrix} \Big/ 64$$

The filter output 363 is provided to Standard deviation estimator 364 which receives also two other inputs 373 and 375 respectively for $\omega_{ijCh}$ and $N_{Ch}$.

Within a considered window centered at the coordinates (c,r), binary value signal $\omega_{ijCh}(c,r)$ 373 is determined by co-sited phase down sampler and hold 372. The down sampler and hold input is the corresponding binary signal $\omega_{ij}(c,r)$ 329 in the luminance case. $N_{Ch}(c,r)$ 375 is the number of $\omega_{ijCh}(c,r)$ in the considered window. $N_{Ch}$ is provided by counter 374.

For example, if the size of a considered window for luminance component or for multiplexed chrominance components is 5 lines by 11 columns, then the effective window for each chrominance component is 5 lines by 5 columns. The co-sited phase down sampling and hold of the luminance window $\omega_{ij}$ is equivalent to multiply element by element the window $\omega_{ij}$ by the following sampling matrix $$\begin{bmatrix} 0 & 1 & 0 & 1 & 0 & 1 & 0 & 1 & 0 & 1 & 0 \\ 0 & 1 & 0 & 1 & 0 & 1 & 0 & 1 & 0 & 1 & 0 \\ 0 & 1 & 0 & 1 & 0 & (1) & 0 & 1 & 0 & 1 & 0 \\ 0 & 1 & 0 & 1 & 0 & 1 & 0 & 1 & 0 & 1 & 0 \\ 0 & 1 & 0 & 1 & 0 & 1 & 0 & 1 & 0 & 1 & 0 \end{bmatrix}$$

when the central element at the coordinates (c,r) correspond to the luminance co-sited phase in standard sampling pattern 4:2:2. The resulted window $\omega_{ijCh}$ is hold for the next non co-sited phase. It will be therefore appreciated that it is the same window for each chrominance component.

In 4:4:4 Y,Cr,Cb sampling pattern, the chrominance components are considered separately. Each chrominance component is applied to a diamond shape high pass filter identical to the luminance one. However, the utilized window for chrominance components $\omega_{ijCh}$ is the same luminance window $\omega_{ij}$ previously described.

The local standard deviation estimator 364 of the high frequency signal provides, in 4:2:2 sampling, multiplexed $s_{hfCr}$ and $s_{hfCb}$ signal 365 which are defined by $$s_{hfCr}(c, r) = (1/N_{Ch}(c, r)) \sum_{i,j} \omega_{ijCh} \cdot |hp(Cr_{ij}(c, r)|$$

$$s_{hfCb}(c, r) = (1/N_{Ch}(c, r)) \sum_{i,j} \omega_{ijCh} \cdot |hp(Cb_{ij}(c, r)|,$$

in which multiplexed $hp(Cr_{ij}(c,r))$ $hp(Cb_{ij}(c,r))$ denotes diamond filter output 363. Since effective shape adaptive window is relatively of small size, 5 lines by 5 columns in the proposed implementation, the hardware division by $N_{Ch}(c,r)$ can be done by a small look up table (not shown).

Similar to the luminance case, the output 365 of Standard deviation Estimator 364 is applied to Lookup table 366 which combines also with User correction level signal 331 to provide estimated local standard deviations $\sigma_{Cr}(c,r)$ and $\sigma_{Cb}(c,r)$ signal 367. The Lookup table 366 is the same Lookup table 325 for luminance component.

The standard deviations signal 367 is provided to low pass filter 368 to reduce eventual halo effect. For multiplexed signal 367, the low pass impulse response is given by the followings:

$$lp_{Ch}(c, r) = \begin{bmatrix} 1 & 0 & 4 & 0 & 6 & 0 & 4 & 0 & 1 \\ 2 & 0 & 8 & 0 & 12 & 0 & 8 & 0 & 2 \\ 1 & 0 & 4 & 0 & 6 & 0 & 4 & 0 & 1 \end{bmatrix} / 64.$$

Low pass filter output 369 is provided to squaring operator 370 to provide variance signal 371 $\sigma^2_{nSCr}$ and $\sigma^2_{nSCb}$ for chrominance part of the Spatial Mosquito Noise Reducer 111.

Now referring to FIG. 4a, there is shown an embodiment of the temporal filter (TF) for noise reduction.

The Temporal Filter 103 for noise reduction receives the Video input 101 and a second input. As explained above, the Video input 101 comprises luminance Y and chrominance Cr/Cb components. The second input may be 108 in the case of the mosquito noise reducer disclosed in FIG. 1 or it may be 208 in the case of the noise reducer disclosed in FIG. 2.

The Temporal Filter 103 is based on well known temporal recursive first order filter of unitary gain. As illustrated by FIG. 4a, it can realized sequentially with adder 401, multiplier 404, adder 406 and frame buffer delay 408. Persons of ordinary skill in the art will understand that the Temporal Filter 103 output 110 is given by:

Temporally filtered video=$b_0$·(Video Input)+$(1-b_0)$·(Filtered Past Video) in which $b_0$ is the filter coefficient 109 and Filtered Past Video 402, frame delayed version of output video, corresponds to the filter signal feedback.

It will be appreciated that the Temporal Filter 103 comprises a Filter Coefficient Calculator 410 which is illustrated in detail by FIG. 4b.

The Filter Coefficient Calculator 410 comprises a Minimum Output Noise Variance Calculation unit 430 and an Embedded Motion Soft Detection (EMSD) unit 460.

The Minimum Output Noise Variance Calculation unit 430 receives as inputs the Video Input 101 and a Filtered Past Video 402. Each of these two video signals is decomposed by splitter, not shown, into three video components Y, Cr and Cb. For the Video input 101, the components are denoted as $Y_c$ (101-Y), $Cr_c$ (101-Cr) and $Cb_c$ (101-Cb). For the Filtered Past Video input 402, the components are denoted as $Y_p$ (402-Y), $Cr_p$ (402-Cr) and $Cb_p$ (402-Cb).

Component-wise Image Differences are firstly calculated with three respective subtractions 431, 432 and 433. For 4:2:2 sampling pattern, each chrominance component difference is furthermore horizontally up-sampled by 2 and hold by device 435 or 436. This operation is equivalent to column duplicating. For Y, Cr and Cb 4:4:4, up-sampling and hold is not necessary. The three resulted image differences are now squared up respectively by 434, 437 and 438. The squaring operator outputs are combined together with summation 439. The summation result 440 is provided to Low Pass Filter 441 which approximates the local signal mean value. The chosen impulse response of the Low-Pass filter 441 is $$lp(c, r) = \begin{bmatrix} 7 & 7 & 7 \\ 7 & 8 & 7 \\ 7 & 7 & 7 \end{bmatrix} / 64,$$

in order to avoid an eventual division by 9 in mean calculation.

Low Pass Filter output 442 representing a variance signal $s^2_{lp}$ is then provided to the Embedded Motion Soft Detection unit 460 and to the gain scaling 443. In the latter, the factor is chosen as 5/16 which approximates the average term 1/3 for the addition of three video component contributions. The gain scaling output 444, denoted $s_0^2$, is sent in turn to the Past Image Noise Variance Estimator 445.

The Past Image Noise Variance Estimator 445 is an estimator for residual noise variance $s_1^2$ in the past filtered image. The Past Image Noise Variance Estimator (PINVE) 445 realizes the following expression $s_1^2 = (1/2) \cdot \max [s_0^2 - \sigma^2_{nT}, \sigma^2_{nT}]$.

Past Image Noise Variance Estimator output 446 $s_1^2$ is applied then to an adder 447 and a divider 449.

The former adder 447 receiving also temporal noise input variance $\sigma^2_{nT}$ 106 yields the sum $(s_1^2 + \sigma^2_{nT})$ 448. The sum result 448 is sent to the Embedded Motion Soft Detection (EMSD) unit 460 and as denominator to divider 449. It can be show that the divider $s_1^2/(s_1^2 + \sigma^2_{nT})$ result 450 yields a theoretical filter coefficient for minimizing output noise variance. In order to reduce excessive small value the calculated filter coefficient $b_{min}$ 453 for still parts of picture is under bounded by an empirical term of 1/16, $b_{min} = \max [s_1^2/(s_1^2 + \sigma^2_{nT}), (1/16)]$.

The filter coefficient $b_{min}$ 453 is provided to the Embedded Motion Soft Detection (EMSD) 460.

The Embedded Motion Soft Detection 460 receives Low Pass Filter Output 442, Sum $(s_1^2 + \sigma^2_{nT})$ 448 and $b_{min}$ 453 for providing final filter coefficient $b_0$. The Embedded Motion Soft Detection 460 comprises Comparator 461, Weighted Local Counter 463 and Motion Soft Combination 465.

The Comparator 461 receives Low Pass Filter Output 442 and Sum $(s_1^2 + \sigma^2_{nT})$ 448 and provides a binary signal representing hard no-motion detection (hnm) 462 which is defined empirically as $$hnm = \begin{cases} 1, & \text{if } (s_{lp}^2 \leq 4(s_1^2 + \sigma^2_{nT})) \\ 0, & \text{if } (s_{lp}^2 > 4(s_1^2 + \sigma^2_{nT})) \end{cases}$$

The hard no-motion detection (hnm) 462 is provided to Weighted Local Counter 463 operating in a local window of 3×3. Based on the nine (9) pixel-based decision context $hnm_{ij}(c,r)$ in the considered window centered at (c,r), Weighted Local Counter 463 provides a no-motion soft decision nm 464 at the coordinates (c,r) as the Following $$nm(c, r) = hnm(c, r) + \sum_{i,j \neq 0,0} (7/64) hnm_{ij}(c, r),$$

Weighted Counter is used to avoid again an eventual division by 9 resulted from 3×3 window. In another word, no-motion decision nm is not a binary value but a fractional one varying from 0 to 1.

The no-motion decision nm 464 and the $b_{min}$ coefficient filter signal 453 are now combined together by the Motion Soft Combination 465 for providing a pixel-based final filter coefficient $b_0$ 109, $b_0 = (nm) \cdot b_{min} + (1-(nm))$.

It has been contemplated that Weighted Local Counter and Motion Soft Combination are simple but robust and efficient.

The Filter coefficient $b_0$ 109 is sent to the Temporal Filter 103 for noise filtering and also, in the case of full version MNR2, to the noise estimation unit 117 for residual noise power estimation. The filter coefficient $b_0$ is directly applied for luminance component or for 4:4:4 pattern sampling. However, for 4:2:2 case, $b_0$ shall be co-sited down sampling and hold, not shown, for chrominance component filtering.

Referring now to FIG. 5, there is illustrated in block diagram an embodiment of the shape adaptive windowing spatial noise reducer 111.

The shape adaptive windowing spatial noise reducer 111 has been described in PCT Application No PCT/CA02/00887, 2002 by the three present authors, the specification of which is hereby incorporated by reference. However banding effect, a resulted filtering artifact, is not discussed in the cited patent application. For completeness, proposed shape adaptive windowing spatial noise reducer 111 will be presented in some detail.

The shape adaptive windowing spatial noise reducer 111 is a modified version of Lee's original Minimum Mean Squared Error (MMSE) reduction (see J. S. Lee, "Digital Image Enhancement and Noise filtering", *IEEE Trans. on Pattern Analysis and Machine Intelligence*, Vol. Pami-2, No. 2, March 1980) which can be stated as follows. Let define an original image f(c,r), a noisy image g(c,r) as input, g(c,r)=f(c,r)+n(c,r) and finally y(c,r) will be the filtered version. If the two first order local statistics, i.e. the mean m(c,r) and the variance $\sigma^2_g(c,r)$, of the image are known, then for additive zero mean and known variance $\sigma^2_n(c,r)$ noise, the filtered signal output is given by:

y(c,r)=m(c,r)+K(c,r)[g(c,r)−m(c,r)] where

K(c,r)=max [0, $(\sigma^2_g(c,r)-\sigma^2_n(c,r))/\sigma^2_g(c,r)$]. Meanwhile, the error performance is written as:

$$E\{[f(c, r) - y(c, r)]^2\} = \begin{cases} \sigma^2_f(c, r), & \text{if } \sigma^2_g(c, r) < \sigma^2_n(c, r) \\ \sigma^2_f(c, r) \cdot \sigma^2_n(c, r) / [\sigma^2_f(c, r) + \sigma^2_n(c, r)], & \text{elsewhere.} \end{cases}$$

For a single linear estimator, Lee's algorithm is perfect when m(c,r), $\sigma^2_g(c,r)$ are known and when $\sigma^2_g(c,r) > \sigma^2_n(c,r)$. However, for practical situations, the two first order local statistics m(c,r) and $\sigma^2_g(c,r)$ are unknown and need to be estimated. On the other hand, when $\sigma^2_g(c,r) < \sigma^2_n(c,r)$, using K(c,r)=0, the small details contained in the original image will be destroyed.

In the following descriptions of the shape adaptive windowing spatial noise reducer, the modifications proposed comprise two major techniques Shape Adaptive Windowing for local mean and variance estimation and Banding Effect Reduction for small signal variance case.

The shape adaptive windowing spatial noise reducer 111 as illustrated in FIG. 1 receives residual noisy three component (Y, Cr, Cb) image 110 provided from the temporal filtering unit 103 and theirs corresponding estimated noise powers 107 provided in turn by the noise estimation unit 117.

As shown in FIG. 5, In FIG. 5, the shape adaptive windowing spatial noise reducer 111 comprises a Luminance Spatial Filter 500 and a Chrominance Spatial Filter 550.

The Luminance Spatial Filter 500 receives respectively luminance component signal $Y_T$ 110-Y and its residual noise power $\sigma^2_{nS}$ 107-Y. The luminance signal $Y_T$ 110-Y is applied as input to Low Pass Filter 501, Local Mean Calculator 507 and Adder 509. Low Pass Filter Output 502 and Threshold Value 503 are sent to Shape Adaptive Window 504 for providing local binary signal $\omega_{ij}(c,r)$ 505 and N(c,r) 506 local number of $\omega_{ij}(c,r)$ in the current window centered at coordinates (c,r). In mosquito noise reducer implementation context, $\omega_{ij}$ and N can be provided from the noise estimation unit 117 with only minor differences.

Moreover, the shape adaptive window 504 technique and its associated Low Pass Filter 502 are already described in previous Sections. Briefly, in segmenting the window in two regions homogenous or not to the current pixel, the shape adaptive window technique allows a more precise estimation of local mean and local variance. Low Pass Filter acting as a pre-processor is required for robust window segmentation.

The calculator 507 receives temporally filtered luminance $Y_T$ 110-Y and local shape adaptive window parameters 505 and 506 respectively for $\omega_{ij}(c,r)$ and N(c,r), provides at its output local mean signal 508 estimated by:

$$m_Y(c, r) = (1/N(c, r)) \sum_{ij} Y_{Tij}(c, r) \omega_{ij}(c, r).$$

The local mean value signal 508 is provided to negative input of adder 509 and to local variance calculator 511.

Using its inputs $Y_T$ 110-Y, $\omega_{ij}(c,r)$ and N(c,r) 505-506 and local mean 508, the calculator 511 estimates luminance variance signal 512 as follows:

$$\sigma^2_{YT}(c, r) = \left[ (1/N(c, r)) \sum_{ij} |Y_{Tij}(c, r) - m_Y(c, r)| \omega_{ij}(c, r) \right]^2.$$

Local luminance variance signal $\sigma^2_{YT}(c,r)$ 512 and local noise power $\sigma^2_{nS}(c,r)$ 107-Y are applied now to Adaptive local gain K calculator 513 which provides the following modification from Lee's original version:

$$K(c, r) = \begin{cases} 1, & \text{if } \sigma^2_{YT}(c, r) = 0 \\ (1 - (be)) \cdot \max[0, (\sigma^2_{YT}(c, r) - & \text{elsewhere.} \\ \sigma^2_{nS}(c, r))/\sigma^2_{YT}(c, r)] + (be), \end{cases}$$

In this equation, the term (be), which varies between 0 and 1, represents the banding effect in slowly varying regions of small variance. The banding effect (be) at a given pixel may be estimated as the ratio of detected "small variance" pixels on the total pixel number in a given sliding window. In one embodiment, the window size is 3×3 with a weighted counter:

$$\begin{bmatrix} 7 & 7 & 7 \\ 7 & (8) & 7 \\ 7 & 7 & 7 \end{bmatrix}$$

In which, the total number count is 64, and the weight 8 corresponds to the central and considered pixel position.

The previously calculated local gain K 514, together with the difference signal 510 from subtraction 509 and the local mean $m_Y$ 508 are used to get the final luminance output 112-Y of the shape adaptive windowing spatial noise reducer (SAW-SNR) 111, $Y_{mnr}(c,r)=m_Y(c,r)+K(c,r)\cdot[Y_T(c,r)-m_Y(c,r)]$. The operation implies subtraction 509, multiplier 515 and adder 517 as illustrated by FIG. 5.

The Chrominance Spatial Filter 550 shown in FIG. 5 receives two chrominance components $Cr_T/Cb_T$ denoted as 110-Cr/Cb, their respective residual noise powers $\sigma^2_{nSCr}/\sigma^2_{nSCb}$ 107-Cr/Cb, and luminance shape adaptive window $\omega_{ij}$ 505.

For Chrominance Spatial Filtering and for 4:2:2 sampling pattern, shape adaptive windowing $\omega_{ij}$ 505 is horizontally down sampled by 2 and hold 551 to provide chrominance shape adaptive windowing $\omega_{ijCh}$ 552 and by counter 553 the local pixel count $N_{Ch}$ 554. It will be appreciated that for 4:4:4, these operations are not necessary.

The skilled addressee will appreciate that similar to the luminance case, remaining parts of the Chrominance Spatial Filter 550 are used to implement the expressions $Cr_{min}(c,r) = m_{Cr}(c,r) + K_{Cr}(c,r) \cdot [Cr_T(c,r) - m_{Cr}(c,r)]$;

$$Cb_{mnr}(c, r) = m_{Cb}(c, r) + K_{Cb}(c, r) \cdot [Cb_T(c, r) - m_{Cb}(c, r)] \text{ where}$$

$$m_{Cr}(c, r) = (1/N_{Ch}(c, r)) \sum_{i,j} Cr_{Tij}(c, r) \omega_{ijCh}(c, r)$$

$$m_{Cb}(c, r) = (1/N_{Ch}(c, r)) \sum_{i,j} Cb_{Tij}(c, r) \omega_{ijCh}(c, r)$$

and $$\sigma^2_{CrT}(c, r) = \left[(1/N_{Ch}(c, r)) \sum_{ij} |Cr_{Tij}(c, r) - m_{Cr}(c, r)| \omega_{ijCh}(c, r)\right]^2$$

$$\sigma^2_{CbT}(c, r) = \left[(1/N_{Ch}(c, r)) \sum_{ij} |Cb_{Tij}(c, r) - m_{Cb}(c, r)| \omega_{ijCh}(c, r)\right]^2.$$

The only difference to the luminance case is the gain $K_{Cr}$ or $K_{Cb}$ computation which does not take care now of banding effect, i.e. be=0.

In such case one gets:

$$K_{Cr}(c, r) = \begin{cases} 1, & \text{if } \sigma^2_{CrT}(c, r) = 0 \\ \max[0, (\sigma^2_{CrT}(c, r) - \sigma^2_{nSCr}(c, r))/\sigma^2_{CrT}(c, r)], & \text{elsewhere,} \end{cases}$$

$$K_{Cb}(c, r) = \begin{cases} 1, & \text{if } \sigma^2_{CbT}(c, r) = 0 \\ \max[0, (\sigma^2_{CbT}(c, r) - \sigma^2_{nSCb}(c, r))/\sigma^2_{CbT}(c, r)], & \text{elsewhere.} \end{cases}$$

Previously described temporal filter 103 and the shape adaptive windowing spatial noise reducer reduce partially blocking artifact. However, for more efficient operation the proposed system includes also the Block Localization unit 102 and the Block Artifact Reducer 113 as illustrated by FIG. 1. Block Localization is required only when picture is provided after some manipulation. In the present invention, the discussion is limited only for the case where blocks are shifted relatively from image boundaries.

Now referring to FIG. 6, there is illustrated an embodiment of a Block Localization unit 102.

The Block Localization unit 102 receives only the luminance component 101-Y of a noisy video input. The block detection will be based only in luminance component and used for three components Y, Cr and Cb in the proposed system.

The Block Localization unit 102 is nearly row-column separable. The received signal 101-Y is applied to two distinct vertical and horizontal branches, specifically to vertical and horizontal line masks 601 and 602. The used line mask impulse responses are given respectively in one embodiment by the two following expressions:

$$vlm(c, r) = \begin{bmatrix} -1 & 2 & -1 \\ -2 & (4) & -2 \\ -1 & 2 & -1 \end{bmatrix}$$

$$hlm(c, r) = \begin{bmatrix} -1 & -2 & -1 \\ 2 & (4) & 2 \\ -1 & -2 & -1 \end{bmatrix}$$

Respective signal outputs 603 and 604 of the above masks are denoted furthermore as $P_{3v}$ and $P_{3h}$.

The vertical signal $P_{3v}$ 603 is applied to Vertical pixel and line delay network 605 which provides eight output signals 607-614. The signals are composed of six pixel signals $P_{3v}$, $P_{2v}$, $P_{1v}$, $P_{0v}$, $P_{4v}$, $P_{5v}$ and two amplitude value signals $A_{1v} = |P_{1v}|$ and $A_{0v} = |P_{0v}|$. The relative positions of 6 cited pixels can be represented in the following window of size 2 columns by 3 lines:

$$\begin{bmatrix} P_{5v} & P_{4v} \\ (P_{0v}) & P_{1v} \\ P_{2v} & P_{3v} \end{bmatrix}.$$

In another words, $P_{2v}$ is pixel delay version of pixel input $P_{3v}$, $P_{1v}$ is line delay version of $P_{3v}$ etc. $P_{0v}$ corresponds furthermore to considered pixel position.

Similarly, the horizontal signal $P_{3h}$ 604 is provided to horizontal network 606 which provides also eight (8) output signals 615-622. The signals comprises six (6) pixel signals $P_{3h}$, $P_{2h}$, $P_{1h}$, $P_{0h}$, $P_{6h}$, $P_{7h}$ and two amplitude value signals $A_{2h} = |P_{2h}|$ and $A_{0h} = |P_{0h}|$. The relative positions of 6 cited pixels may be represented in the following window of size 3 columns by 2 lines:

$$\begin{bmatrix} P_{7h} & (P_{0h}) & P_{1h} \\ P_{6h} & P_{2h} & P_{3h} \end{bmatrix}.$$

$P_{2h}$ is pixel delay version of pixel input $P_{3h}$, $P_{1h}$ is line delay version of $P_{3h}$ etc. $P_{0h}$ corresponds furthermore to considered pixel position.

The signal set (607-614) is applied to the Vertical Block Border Test 623 for preliminary vertical block detection. The Vertical Test 623 in pseudo code is given as follows:

---

If (Threshold1 < $A_{0v}$ < Threshold 2) and
(Threshold1 < $A_{1v}$ < Threshold 2)
(sign($P_{0v}$) ≠ sign($P_{1v}$)) and (sign($P_{2v}$) ≠ sign($P_{3v}$)) and
(sign($P_{4v}$) ≠ sign($P_{5v}$)),
then out$_v$ = 1
else, out$_v$ = 0.

---

In another words, the Vertical Test 623 performs both threshold and zero crossing detections.

Again in similar manner, Horizontal Test 624 performs the following test:

```
If (Threshold1 < A_{0h} < Threshold 2) and
    (Threshold1 < A_{2h} < Threshold 2)
    (sign(P_{0h}) ≠ sign(P_{2h})) and (sign(P_{1h}) ≠ sign(P_{3h})) and
    (sign(P_{6h}) ≠ sign(P_{7h})),
    then out_h = 1
    else, out_h = 0.
```

The detection results $out_v$ and $out_h$, 625 and 626, are sent respectively to Vertical and Horizontal 8-pins Histogram Counters and Two Maximum values Detection 627 and 628.

The former Vertical Histogram-based Detector 627 provides at its outputs a set of 4 results (629-632): $Ch_{m1}$ corresponds to the first maximum histogram amplitude and its associative position $Ih_{m1}$, $Ch_{m2}$ and $Ih_{m2}$ correspond to the second maximum. $Ih_{m1}$ and $Ih_{m2}$ are possible 8 shift values from 0 to 7. It is interesting to note that vertical line detection implies horizontal position.

In similar manner, Horizontal Histogram-based Detector 628 provides a set of $Cvm1$, $Iv_{m1}$, $Cv_{m2}$ and $Iv_{m2}$, denoted by (633-636).

Each set of detected results is then provided to respective Offset Detection: (629-632) to Horizontal Offset Detector 637 and (633-636) to Vertical Offset Detector 638.

Horizontal Offset Detector 637 is described in pseudo code as follows:

```
If (Ch_{m2} ≥ 0.75Ch_{m1}) then Offset_x = 8,
    else        Offset_x = Ih_{m1}.
```

Vertical Offset Detector 638 is described in pseudo code as follows:

```
If (Cv_{m2} ≥ 0.75Cv_{m1}) then Offset_y = 8,
    else        Offset_y = Iv_{m1}.
```

In which value 8 denotes no block border detected meanwhile 0 to 7 denote possible block border shifts.

Detected Offset_x and Offset_y, 639 and 640, are provided to Offset Correction 650 which is a logical combination of the two detected offset inputs:

```
If (Offset_x ≠ 8) then Offset_x = [Offset_x + 1]_{modulo 8}
If (Offset_y ≠ 8) then Offset_y = [Offset_y + 1]_{modulo 8}
If (Offset_x = 8) and (Offset_y ≠ 8) then
    Offset_x = 0
    Offset_y = Offset_y
else if (Offset_y = 8) and (Offset_x ≠ 8) then
    Offset_y = 0
    Offset_x = Offset_x
else
    Offset_x = Offset_x
    Offset_y = Offset_y.
```

The corrected Offset_x and Offset_y values 104 and 105 are provided to the Noise Estimation unit 117 and to the Block Artifact Reducer 113 as shown in FIG. 1.

Referring now to FIG. 7a, there is illustrated an embodiment of the Block Artifact Reducer unit 113 in accordance with the invention.

The Block Artifact Reducer unit 113 receives the video signal 112 of three components $Y_{mnr}$, $Cr_{mnr}$ and $Cb_{mnr}$ delivered by Spatial Mosquito Noise Reducer 111, the Block Artifact Reducer (BAR) unit 113 receives also the two Offset value signals 104 and 105 provided in turn by the Block Localization unit 102. The Block Artifact Reducer (BAR) unit 113 comprises a Luminance Block Artifact Reducer 700 and Chrominance Block Artifact Reducer 720.

The Luminance Block Artifact Reducer 700 comprises a Border Mask Generator (BMG) 701, a High Frequency Region Detector (HFRD) 703, a Line Direction Detector (LDD) 705, a Directional Low Pass Filters (4) (DLPF) 707 and a Luminance Decision Selector (LDS) 712.

The Border Mask Generator 701 receives the two Offset value signals 104 and 105 to generate DCT block border shifted respectively by Offset_x and Offset_y. In the embodiment disclosed, border size is one pixel width; block size is 8×8 for progressive signal and chrominance components, block size is 4 lines by 8 columns for interlaced luminance signal. The Border Mask Generator 701 provides at its output 702 Bmask signal of three values: 0, 1 and 2 respectively for no border, vertical and horizontal border. The Bmask signal 702 is provided to a Luminance Decision Selector 712 and to a Chrominance Decision Selector 724. The skilled addressee will understand how to realize such Border Mask Generator.

The High Frequency Region Detector 703 receives the luminance component $Y_{mnr}$ 112-Y provided by Spatial Mosquito Noise Reducer. The High Frequency Region Detector 703 comprises in series, not shown, a high pass filter, an absolute value threshold detector and two context-based 3×3 binary filters for consolidation of decision results. The High Frequency Region Detector 703 output 704 denoted as isolmap, isolation map, is provided to the Luminance Decision Selector 712 to inhibit the correction for avoiding eventual high frequency alias contained in the incoming signal.

More precisely, the high pass filter impulse response is given by:

$$hp(c, r) = \begin{bmatrix} -1 & -2 & -1 \\ -2 & 12 & -2 \\ -1 & -2 & -1 \end{bmatrix} / 16.$$

The absolute value threshold detector comprises an absolute value operator followed by a comparator with a given threshold. The output of the comparator is equal to "1" if the input absolute value is greater than a given threshold, otherwise the output of the comparator is equal to "0".

Finally, utilized context based Consolidation operation is defined by the following 3×3 Add-Remove & Double Thresholds Binary filters:

Let a given binary (0, 1) image and let a sliding window around the pixel of interest. The operation output s is described by:

$$s = \begin{cases} 1, & \text{if Threshold } 1 < \sum \text{"1"} < \text{Threshold } 2 \\ 0, & \text{else} \end{cases}$$

in which the summing is effected for binary pixels in the given window.

The Consolidation Operation, similar to morphologic filter, is useful after a threshold decision.

Line Direction Detector 705, illustrated in more details in FIG. 7b, receives the luminance component $Y_{mnr}$ 112-Y, the luminance component is applied to the inputs of four high pass filters $HP_0$, $HP_1$, $HP_2$ and $HP_3$ 751-754, operating respectively in four principal spatial directions: 0°, 45°, 90° and 135°. Their impulse responses are:

$$h_0(c) = [\,-1 \quad 2 \quad -1\,]$$

$$h_1(c, r) = \begin{bmatrix} 0 & 0 & -1 \\ 0 & 2 & 0 \\ -1 & 0 & 0 \end{bmatrix}$$

$$h_2(r) = \begin{bmatrix} -1 \\ 2 \\ -1 \end{bmatrix}$$

$$h_3(c, r) = \begin{bmatrix} -1 & 0 & 0 \\ 0 & 2 & 0 \\ 0 & 0 & -1 \end{bmatrix}$$

Each filter output is applied to an absolute value operator. The four absolute value operator outputs $h_0$, $h_1$, $h_2$ and $h_3$, 765-768, are provided in turn to Direction Decision unit 759.

The Direction Decision unit 759 provides its output denoted as d and performs the following operations:

Sort $h_0$, $h_1$, $h_2$ and $h_3$ in ascendant order:
$m_1 \leq m_2 \leq m_3 \leq m_4$
Decision on the direction:

---
If ($m_4 \leq 16$) then d = 4
else if (($m_2 - m_1$) < 1) then d = 4
else d = $i_1$
--- where:
4 indicates an invalid direction
$i_1 = \{0, 1, 2, 3\}$ is the index associated to $m_1$.

The Direction Decision Output 760 is provided to the unit Decision Consolidation 0, 761. The latter output denoted as $d_0$ 762 is provided from the following operations:

Count the frequency of each direction in a local window 3×3,

Sort in ascendant order according to the frequency of each direction,

Make Decision based on majority vote:

---
If ($freq_{max} \geq 4$) then
　If($dir_{max} \neq 4$) then
　　$d_0$ = $dir_{max}$
　else do nothing
else
　　$d_0$ = 4
--- wherein:
$dir_{max}$ is the direction having the frequency $freq_{max}$.

The output $d_0$ 762 is applied again to another Direction Consolidation 1, 763 whose the output 706 denoted now dir resulted from the followings:

Count the frequency of each direction in a local window 3×3,

Sort in ascendant order according to the frequency of each direction,

Decision based on majority vote:

---
If ($freq_{max} \geq 4$) then
　dir = $dir_{max}$
else do nothing
--- wherein:
$dir_{max}$ is the direction having the frequency $freq_{max}$.

The dir output 706 is provided finally to the Luminance Decision Selector 712 in referring back to FIG. 7a.

The received luminance signal $Y_{mnr}$, 112-Y is also applied to a set 707 of four directional low pass filters $LP_0$, $LP_1$, $LP_2$ and $LP_3$ operating respectively in four directions: 0°, 45°, 90° and 135°.

The four filter outputs 708-711 denoted as Ip0, Ip45, Ip90 and Ip135 and the received luminance signal $Y_{mnr}$ 112-Y are applied together to the Luminance Decision Selector 712.

For providing a luminance output signal $Y_{mnr\text{-}bar}$ 114-Y, the Luminance Decision Selector 712 selects, in function of the three signals bmask 702, isolmap 704 and dir 706, one of the five luminance signals at its inputs as follows:

---
If (isolmap ≠ 0) then
　$Y_{mnr\text{-}bar}$ = $Y_{mnr}$
else if (bmask = 0) then
　$Y_{mnr\text{-}bar}$ = $Y_{mnr}$
else if (bmask =1) then
　if(dir = 2) then
　　$Y_{mnr\text{-}bar}$ = $Y_{mnr}$
　if(dir = 1) then
　　$Y_{mnr\text{-}bar}$ = Ip45
　if(dir = 3) then
　　$Y_{mnr\text{-}bar}$ = Ip135
　else
　　$Y_{mnr\text{-}bar}$ = Ip0
else if (bmask =2) then
　if(dir = 0) then
　　$Y_{mnr\text{-}bar}$ = $Y_{mnr}$
　else if(dir = 1) then
　　$Y_{mnr\text{-}bar}$ = Ip45
　else if(dir = 3) then
　　$Y_{mnr\text{-}bar}$ = Ip135
　else
　　$Y_{mnr\text{-}bar}$ = Ip90
---

The part of Chrominance Block Artifact Reducer 720 is much simpler than the Luminance Block Artifact Reducer 700 in the embodiment disclosed. The received chrominance components Cr/Cb 112-Cr/Cb is provided to a set 721 of two low pass filters operating respectively in horizontal and vertical directions. Impulse responses of these filters are $Ip_0(c)$ and $Ip_2(r)$ previously described. The received chrominance components Cr/Cb 112-Cr/Cb and its filtered versions Ip0, 722 and Ip90, 723 are sent to the Chrominance Decision Selector 724. The latter receiving bmask signal 702 selects the followings for its output 114-Cr/Cb signals $Cr_{mnr\text{-}bar}$ and $Cb_{mnr\text{-}bar}$:

---
If (bmask = 1) then
　$Cr_{mnr\text{-}bar}/Cb_{mnr\text{-}bar}$ = Ip0
else if (bmask = 2) then
　$Cr_{mnr\text{-}bar}/Cb_{mnr\text{-}bar}$ = Ip90
else
　$Cr_{mnr\text{-}bar}/Cb_{mnr\text{-}bar}$ = $Cr_{mnr}/Cb_{mnr}$
---

The three component $Y_{mnr-bar}$, $Cr_{mnr-bar}$, $Cb_{mnr-bar}$ video output 114 are provided to an optional Adaptive Detail Enhancer 115 as illustrated in FIG. 1.

Referring now to FIG. 8, there is illustrated in an embodiment of the Adaptive Detail Enhancer.

Operating only on luminance component, the proposed Adaptive Detail Enhancer provides the received signal $Y_{mnr-bar}$ 114-Y to an High Frequency Region Detector 802, to a set of eight directional masks, 810-817: Mask 0°, Mask 45°, ... Mask 315° and finally to Multiplexer 801.

The High Frequency Region Detector 802 is similar to the High Frequency Region Detector 703 already described in previous corresponding sections. The High Frequency Region Detector 802 provides a control signal 803 to inhibit Detail Enhancer action in high frequency region.

Eight directional masks from Mask 0°, Mask 45°, ... to Mask 315° determine eight directional signal variations 850-857 for a given pixel of coordinates (c,r). The 8 above cited masks in the proposed implementation are described by the followings:

$$mask0°(c, r) = \begin{bmatrix} 0 & 0 & 0 \\ 0 & (2) & -2 \\ 0 & 0 & 0 \end{bmatrix} \Big/ 16, mask45°(c, r) = \begin{bmatrix} 0 & 0 & -1 \\ 0 & (1) & 0 \\ 0 & 0 & 0 \end{bmatrix} \Big/ 16,$$

$$mask90°(c, r) = \begin{bmatrix} 0 & -2 & 0 \\ 0 & (2) & 0 \\ 0 & 0 & 0 \end{bmatrix} \Big/ 16, mask135°(c, r) = \begin{bmatrix} -1 & 0 & 0 \\ 0 & (1) & 0 \\ 0 & 0 & 0 \end{bmatrix} \Big/ 16,$$

$$mask180°(c, r) = \begin{bmatrix} 0 & 0 & 0 \\ -2 & (2) & 0 \\ 0 & -2 & 0 \end{bmatrix} \Big/ 16,$$

$$mask225°(c, r) = \begin{bmatrix} 0 & 0 & 0 \\ 0 & (1) & 0 \\ -1 & 0 & 0 \end{bmatrix} \Big/ 16,$$

$$mask270°(c, r) = \begin{bmatrix} 0 & 0 & 0 \\ 0 & (2) & 0 \\ 0 & -2 & 0 \end{bmatrix} \Big/ 16, mask315°(c, r) = \begin{bmatrix} 0 & 0 & 0 \\ 0 & (1) & 0 \\ 0 & 0 & -1 \end{bmatrix} \Big/ 16.$$

Each of the eight mask output signals is now applied to its corresponding multiplier 834-841 and its Amplitude Function 818-825.

Each Amplitude Function in the set 818-825 receiving its respective signal variation and its other parameters (max, min values) generates, from signal variation amplitude, a function output varying from zero to 1. In the embodiment disclosed, the function output is equal to 1 if the signal variation amplitude is located between min and max value, elsewhere it is equal to zero. The min and max values are chosen such that eventual small or strong noise should be not enhanced.

Each function signal output 826-833 is provided in turn to respective multiplier 834-841 for weighting the signal variation 850-857. Eight multiplier outputs 842-849 are added together via adders 860-866 to provide an enhancing signal 867. The latter is weighted furthermore by user controlled enhancement level 806 which is a varying value between 0 and 1. The user level weighting is performed by multiplier 807. Multiplier result 808 is combined with the luminance input 114-Y via adder 805 to form an enhanced luminance signal 809 which is applied in turn to the input 0 of multiplexer 801.

It should be appreciated that the embodiment disclosed enhances the video signal differently in each of eight principal directions.

For avoiding eventual alias artifact usually in high frequency regions, the Multiplexer 801 selects simply the luminance input 114-Y if considered pixel belongs to such region. If not, selected signal is the enhanced luminance signal 809. Multiplexer output 116-Y is denoted as $Y_{mnr-enh}$.

Referring now to FIG. 10, there is shown an embodiment of a Region Adaptive Facet Based Spatial Noise Reducer (RAFB-SNR).

As previously mentioned, in order to exploit the Minimum Mean Square Error criterion in spatial filtering, it is necessary to know the local signal mean and variance values with some precision. The proposed shape adaptive windowing for mean and variance estimation cannot necessary precise when the original signal is not constant but slowly varying and locally represented as a sloped facet (piecewise linear model) or a piecewise quadratic model. Moreover, in the present disclosure, an image segmentation is already disclosed. It can be useful for an adaptation of facet model order determination.

Sloped Facet based Noise Reducer has been originally suggested in the R. M. Haralick, L. T. Watson, *A facet model for image data*, Computer Graphics Image Processing, Vol. 15, pp. 113-129, 1981. In which, the estimated mean value is used for denoising signal value. In the followings, a region adaptive facet based spatial noise reducer (RAFB-SNR) is disclosed. The spatial noise reducer comprises two different innovations: a)—Minimum Mean Square Error denoising technique, b)—Facet models (piecewise linear or piecewise quadratic) adaptation depending on segmented regions.

The region adaptive facet based spatial noise reducer (RAFB-SNR) 111 as illustrated in FIG. 10 receives residual noisy three component (Y, Cr, Cb) image 110 provided from the temporal filter 103 and theirs corresponding estimated noise powers 107 provided in turn by the noise estimation unit 117.

The received video 110 is provided to Adaptive Facet Parameters Calculator 1003, Adder 1010, Facet based Local Variance Estimator 1006 and to an optional Image Segmentation module 1001.

The Image Segmentation module 1001 provides a binary signal output 1002 Flat/No-Flat regions. The module, illustrated in FIG. 10 for comprehensive and completeness purpose, may be easily derived from the noise estimation unit 117 which is illustrated in FIG. 3. The Flat/No-Flat regions signal 1002 is sent to Adaptive Facet Parameters Calculator 1003.

Facet Parameters utilized in the invention are the coefficients $b_0(c,r)$, $b_1(c,r)$, ..., $b_5(c,r)$ which approximate in the least squared fit an incoming signal $y(i,j; c,r)$ in a window centered at the coordinates (c,r):

$$b_k(c, r) = \arg\min \sum_i \sum_j \left\{ y(i, j; c, r) - \begin{bmatrix} b_0(c, r) + b_1(c, r)i + b_2(c, r)j + \\ b_3(c, r)i^2 + b_4(c, r)ij + b_5(c, r)j^2 \end{bmatrix} \right\}^2.$$

This expression is used when the central pixel is classified belong to a No-Flat region. For an estimated Flat region signal, the coefficients $b_3$, $b_4$ and $b_5$ are set to be equal to zero.

The coefficient $b_0(c,r)$ corresponds furthermore to the local signal mean signal 1004:

$$\text{mean}(c,r) = b_0(c,r).$$

The six (6) coefficients $b_k(c,r)$ 1004 and 1005 are provided to Facet based Local variance estimator 1006 which provides in turn variance signal 1007 by the following expression:

$$\text{var}(c, r) = \sum_i \sum_j \left\{ y(i, j, c, r) - \begin{bmatrix} b_0(c, r) + b_1(c, r)i + b_2(c, r)j + \\ b_3(c, r)i^2 + b_4(c, r)ij + b_5(c, r)j^2 \end{bmatrix} \right\}^2.$$

The Local variance signal 1007 and Residual noise power $\sigma^2_{nS}$ 107 provided from the noise estimation unit 117 are used together by Adaptive Gain Calculator 1008 which yields in turn a gain signal K 1009. Adaptive Gain K Calculator according to Minimum Mean Square Error criterion is previously described.

Adder 1010, Multiplier 1012 and Adder 1014 are used to form Minimum Mean Square Error denoising signal output 103.

For simplicity purpose, higher order facet model is not utilized. This completes the discussion of RAFB-SNR illustrated by FIG. 10.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal.

The embodiment(s) of the invention described above is(are) intended to be exemplary only. The scope of the invention is therefore intended to be limited solely by the scope of the appended claims.

What is claimed is:

1. A method for reducing noise in a DCT-based decoded image, said method comprising:
   a. associating each pixel of a plurality of pixels defining said image to a corresponding image region type having distinct spatial characteristics;
   b. estimating artifact statistical characteristics of each of said pixels using said associated corresponding image region type; and
   c. performing a tempo-spatial filtering of each of said pixels using said artifact estimated statistical characteristics, said performing of said tempo-spatial filtering comprising performing a temporal filtering to provide a temporally filtered signal and then performing a spatial filtering of said temporally filtered signal;
   calculating a corrected signal against artifact related to a compression technique used for encoding said image using said temporally-spatially filtered signal and calculating an indication of an offset in said image for use in at least one of said calculating a corrected signal and said estimating artifact statistical characteristics whereby the filtered pixels are used for producing said image having reduced noise.

2. The method as claimed in claim 1, further comprising calculating a final enhanced image without enhanced high frequency alias using said corrected signal.

3. The method as claimed in claim 1, further comprising calculating a corrected signal against artifact related to a compression technique used for encoding said image using said temporally-spatially filtered signal.

4. The method as claimed in claim 1, wherein said estimating said artifact statistical characteristics further comprises using said temporally filtered signal and said image; further wherein at least one of said spatial filtering and said temporal filtering comprises using said artifact statistical characteristics.

5. The method as claimed in claim 4, further comprising calculating a corrected signal against artifact related to a compression technique used for encoding said image using said temporally-spatially filtered signal.

6. The method as claimed in claim 5, further comprising calculating an indication of an offset in said image for use in at least one of said calculating a corrected signal and said estimating artifact statistical characteristics.

7. The method as claimed in claim 1, wherein said image comprises a luminance signal and a chrominance signal, further wherein said estimating artifact statistical characteristics of each of said pixels comprises estimating artifact statistical characteristics of said chrominance signal of each pixel and estimating artifact statistical characteristics of said luminance signal of each pixel, said artifact statistical characteristics of said chrominance signal of each pixel and said artifact statistical characteristics of said luminance signal of each pixel forming said artifact statistical characteristics of each pixel.

8. The method as claimed in claim 7, further comprising segmenting an image using said luminance signal, further comprising measuring noise using said luminance signal and a user correction signal, and further comprising estimating said artifact statistical characteristics of said luminance signal of each pixel using said measured noise and said segmenting of said image.

9. The method as claimed in claim 8, wherein said image segmenting comprises:
   a. detecting strong edges using said luminance signal, and calculating a detected strong edge signal;
   b. detecting strong texture using said received luminance signal and calculating a detected strong texture signal;
   c. using segmentation logics with said detected strong edge signal and said detected strong texture signal to provide at least one of a texture (T) signal, a flat region (F) signal, a detected edge (E) signal and a Near Edge and Flat (NEF) signal;
   d. correlation mapping using said at least one of a texture (T) signal, a flat region (F) signal, a detected edge (E) signal and a Near Edge and Flat (NEF) signal, solving ambiguities in said segmentation signal, wherein a detected edge (E) signal has a greater priority than a Near Edge and Flat (NEF) signal which has a greater priority than a flat region (F) signal and which has a greater priority than a texture (T) signal.

10. The method as claimed in claim 1, wherein said temporal filtering calculates said temporally filtered signal (TF) such that:

$TF = b_0 \cdot (\text{Videoinput}) + (1-b_0) \cdot (\text{filteredpreviousvideo})$,
   wherein $b_0$ is a pixel-based final filter coefficient, further wherein said filtered previous video is a time preceding temporally filtered signal.

11. The method as claimed in claim 10, wherein said pixel-based final filter coefficient $b_0$ is dynamically generated by performing temporal filtering.

12. The method as claimed in claim 11, wherein said temporal filtering comprises:
   a. computing a minimum output noise variance using said filtered previous video and said pixel, computing a first filter coefficient $b_{min}$, wherein $b_{min} = \max(s_1^2/(s_1^2 + \sigma_{nT}^2); (1/16))$, further wherein $$s_1^2 = \frac{1}{2} \cdot \max((s_0^2 - \sigma_{nT}^2); \sigma_{nT}^2),$$

wherein $s_0^2$ is a result from a gain scaling of a filtered combination of differences between current image components and previous image components, further wherein $\sigma_{nT}^2$ is a temporal noise input variance; and
   b. detecting soft motion using at least the first filter coefficient $b_{min}$ and $\text{Sum}(s_1^2 + \sigma_{nT}^2)$ and providing said pixel-based final filter coefficient $b_0$ such as $b_0 = (nm) \cdot b_{min} + (1 - (nm))$, wherein $$nm(c, r) = hnm(c, r) + \sum_{i,j \neq 0,0} (7/64) \cdot hnm_{ij}(c, r)$$

further wherein $$hnm = \begin{cases} 1, & \text{if } (s_{lp}^2 \leq 4(s_1^2 + \sigma_{nT}^2)) \\ 0, & \text{if } (s_{lp}^2 > 4(s_1^2 + \sigma_{nT}^2)) \end{cases}.$$

13. The method as claimed in claim 1, wherein said corresponding given image region type comprises at least one of a texture (T) signal, a flat region (F) signal, a detected edge (E) signal and a Near Edge and Flat (NEF) signal.

14. A method for reducing noise in a DCT-based decoded image, said method comprising: a. associating each pixel of a plurality of pixels defining said image to corresponding image region type having distinct spatial characteristics; b. estimating artifact statistical characteristics of each of said pixels using said associated corresponding image region type; c. performing a filtering of each of said pixels using said artifact estimated statistical characteristics, whereby the filtered pixels produce said image having reduced noise; and d. correcting said filtered pixels against artifacts related to a compression technique used for encoding said image, wherein said performing of said filtering comprises performing a temporal filtering to provide a temporally filtered signal and then performing a spatial filtering of said temporally filtered signal and further comprising generating offset data related to said DCT-based decoded image; further wherein said correcting of said filtered pixels against artifacts related to a compression technique used for encoding said image is performed using said generated offset data.

15. An apparatus for reducing noise in a DCT-based decoded image, said apparatus comprising: a. a noise estimation unit for providing noise statistical characteristics of each pixel of a plurality of pixels defining said image, wherein said artifact statistical characteristics of each pixel are estimated by associating to a given pixel a corresponding given image region type having distinct spatial characteristics; and b. a tempo-spatial filtering unit receiving said artifact statistical characteristics of each pixel and filtering said pixel accordingly to provide a temporally-spatially filtered signal, wherein said tempo-spatial filtering unit comprises a temporal filter and a spatial noise filter, further wherein said temporal filter provides a temporally filtered signal to said spatial noise filter which provides said temporally-spatially filtered signal and wherein said noise estimation unit provides said artifact statistical characteristics using said temporally filtered signal; further wherein said artifact statistical characteristics are provided to said spatial noise filter.

16. The apparatus as claimed in claim 15, wherein said noise estimation unit further receives a user correction level signal.

17. The apparatus as claimed in claim 15, further comprising a block artifact reducer receiving said temporally-spatially filtered signal and providing a corrected signal against artifact related to a compression technique used for encoding said image.

18. The apparatus as claimed in claim 17, further comprising a block localization unit for receiving said image and providing an indication of an offset in said image to said block artifact reducer and to said noise estimation unit.

19. The apparatus as claimed in claim 18, further comprising a detail enhancer receiving said corrected signal and producing a final enhanced image without enhanced high frequency alias.

20. The apparatus as claimed in claim 15, further comprising a block artifact reducer receiving said temporally-spatially filtered signal and providing a corrected signal against artifacts related to a compression technique used for encoding said image.

21. The apparatus as claimed in claim 15, wherein said noise estimation unit provides said artifact statistical characteristics using said temporally filtered signal and said image; further wherein said artifact statistical characteristics are provided to said spatial noise filter and to said temporal filter.

22. The apparatus as claimed in claim 21, further comprising a block artifact reducer receiving said temporally-spatially filtered signal and providing a corrected signal against artifacts related to a compression technique used for encoding said image.

23. The apparatus as claimed in claim 22, further comprising a block localization unit for receiving said image and providing an indication of an offset in said image to said block artifact reducer and to said noise estimation unit.

24. The apparatus as claimed in claim 23, further comprising a detail enhancer receiving said corrected signal.

25. The apparatus as claimed in claim 15, wherein said image comprises a luminance signal and a chrominance signal, further wherein said noise estimation unit comprises a noise estimation unit for said luminance signal and a noise estimation unit for said chrominance signal, further wherein said noise estimation unit for said chrominance signal provides artifact statistical characteristics of said chrominance signal of each pixel and further wherein said noise estimation unit for said luminance signal provides artifact statistical characteristics of said luminance signal of each pixel, said artifact statistical characteristics of said chrominance signal of each pixel and said artifact statistical characteristics of said luminance signal of each pixel forming said artifact statistical characteristics of each pixel.

26. The apparatus as claimed in claim 25, wherein said noise estimation unit for said luminance signal comprises an image segmentation unit, a noise measurement unit and a noise weighting unit, further wherein said image segmentation unit receives said luminance signal and provides a segmentation signal, further wherein said noise measurement unit receives said luminance signal and a user correction signal and provides a noise measured signal, further wherein said noise weighting unit receives said noise measured signal and said segmentation signal and provides said artifact statistical characteristics of said luminance signal of each pixel.

27. The apparatus as claimed in claim 26, wherein said image segmentation unit comprises: a. an edge detector for detecting strong edges using said received luminance signal, and for providing a detected strong edge signal; b. a strong texture detector for detecting strong texture using said received luminance signal and for providing a detected strong texture signal; c. segmentation logics receiving said detected strong edge signal and said detected strong texture signal and providing at least one of a texture (T) signal, a flat region (F) signal, a detected edge (E) signal and a Near Edge and Flat (NEF) signal; d. a correlation map receiving said at least one of a texture (T) signal, a flat region (F) signal, a detected edge (E) signal and a Near Edge and Flat (NEF) signal, solving ambiguities in said segmentation signal, wherein a detected edge (E) signal has a greater priority than a Near Edge and Flat (NEF) signal which has a greater priority than a flat region (F) signal and which has a greater priority than a texture (T) signal.

28. The apparatus as claimed in claim 15, wherein said corresponding given image region type comprises at least one of a texture (T) signal, a flat region (F) signal, a detected edge (E) signal and a Near Edge and Flat (NEF) signal.

29. The apparatus as claimed in claim 15, wherein said temporal filter provides said temporally filtered signal (TF) such that:

TF=$b_0$(Videoinput)+(1−$b_0$)(filteredpreviousvideo),
wherein $b_0$ is a pixel-based final filter coefficient, further wherein said filtered previous video is a time preceding temporally filtered signal.

30. The apparatus as claimed in claim 29, wherein said pixel-based final filter coefficient $b_0$ is dynamically generated using a temporal filter coefficient computation unit.

31. The apparatus as claimed in claim 30, wherein said temporal filter coefficient computation unit comprises:
 e. a minimum output noise variance computation unit receiving said filtered previous video and said pixel, computing a first filter coefficient $b_{min}$, wherein $b_{min}$=max($s_1^2$/($s_1^2$+$\sigma_{nT}^2$);(1/16)), further wherein $$s_1^2 = \frac{1}{2} \cdot \max((s_0^2 - \sigma_{nT}^2); \sigma_{nT}^2),$$

wherein $s_0^2$ is a result from a gain scaling of a filtered combination of differences between current image components and previous image components, further wherein $\sigma_{nT}^2$ is a temporal noise input variance; and
 f. a motion soft detection unit receiving at least the first filter coefficient $b_{min}$ and Sum($s_1^2$+$\sigma_{nT}^2$) and providing said pixel-based final filter coefficient $b_0$ such as $b_0$= (nm)·$b_{min}$+(1−(nm)), wherein $$nm(c, r) = hnm(c, r) + \sum_{i,j \neq 0,0} (7/64) \cdot hnm_{ij}(c, r),$$

further wherein $$hnm = \begin{cases} 1, & \text{if } (s_{lp}^2 \leq 4(s_1^2 + \sigma_{nT}^2)) \\ 0, & \text{if } (s_{lp}^2 > 4(s_1^2 + \sigma_{nT}^2)) \end{cases}.$$

* * * * *